United States Patent
Ollila

(10) Patent No.: US 12,256,161 B2
(45) Date of Patent: Mar. 18, 2025

(54) SIMULTANEOUS SUBSAMPLING AND HIGH DYNAMIC RANGE IMAGING IN MULTI-CAMERA SYSTEMS

(71) Applicant: Varjo Technologies Oy, Helsinki (FI)

(72) Inventor: Mikko Ollila, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 77 days.

(21) Appl. No.: 18/357,654

(22) Filed: Jul. 24, 2023

(65) Prior Publication Data

US 2025/0039564 A1 Jan. 30, 2025

(51) Int. Cl.
*H04N 25/40* (2023.01)
*H04N 23/84* (2023.01)
*H04N 25/57* (2023.01)

(52) U.S. Cl.
CPC ........... *H04N 25/41* (2023.01); *H04N 23/843* (2023.01); *H04N 25/57* (2023.01)

(58) Field of Classification Search
CPC ....... H04N 25/41; H04N 25/57; H04N 23/843
See application file for complete search history.

(56) References Cited

U.S. PATENT DOCUMENTS

| | | | | |
|---|---|---|---|---|
| 2010/0309350 A1* | 12/2010 | Adams, Jr. | ............ | H04N 25/135 348/E9.01 |
| 2012/0013749 A1* | 1/2012 | Oberdoerster | ....... | H04N 23/843 348/222.1 |
| 2013/0083220 A1* | 4/2013 | Imade | ................... | G06T 3/4069 348/239 |
| 2015/0138398 A1* | 5/2015 | Hayashi | ............... | H04N 25/134 348/234 |
| 2018/0338126 A1* | 11/2018 | Trevor | ................. | H04N 23/698 |
| 2023/0239583 A1* | 7/2023 | Vercauteren | ..... | A61B 1/000096 348/273 |

* cited by examiner

*Primary Examiner* — Amy R Hsu
(74) *Attorney, Agent, or Firm* — Ziegler IP Law Group, LLC.

(57) ABSTRACT

First image data and second image data are captured by a first image sensor and second image sensor(s), using at least two different settings. The first image data includes first subsampled image data of at least a first part of a first field of view of the first image sensor that has at least a part of overlapping field of view. The first image data and the second image data are processed together, using HDR imaging technique, to generate a first HDR image and a second HDR image. During processing, interpolation and demosaicking is performed on the first subsampled image data, by employing the second image data and using HDR imaging technique. Demosaicking is performed on the second image data, by employing the first image data and using HDR imaging technique.

15 Claims, 7 Drawing Sheets

SIMULTANEOUS SUBSAMPLING AND HIGH DYNAMIC RANGE IMAGING IN MULTI-CAMERA SYSTEMS

TECHNICAL FIELD

The present disclosure relates to imaging systems incorporating simultaneous subsampling and high dynamic range (HDR) imaging in multi-camera systems. The present disclosure also relates to methods incorporating simultaneous subsampling and HDR imaging in multi-camera systems.

BACKGROUND

Nowadays, with an increase in the number of images being captured every day, there is an increased demand for developments in image capturing and processing. Such a demand is quite high and critical in case of evolving technologies such as immersive extended-reality (XR) technologies which are being employed in various fields such as entertainment, real estate, training, medical imaging operations, simulators, navigation, and the like. Several advancements are being made to develop image capturing and processing technology.

However, existing image capturing and processing technology has several limitations associated therewith. The existing image capturing and processing technology is inefficient in terms of generating images that have high dynamic range (HDR) characteristics throughout a wide field of view, at a high framerate. This is because processing of image signals captured by pixels of an image sensor requires considerable processing resources, involves a long processing time, requires high computing power, and limits a total number of pixels that can be arranged on an image sensor for full pixel readout at a given frame rate. As an example, image signals corresponding to only about 10 million pixels on the image sensor may be processed currently (by full pixel readout) to generate images at 90 frames per second (FPS). This is far less than about 50 million pixels required to be read at 90 FPS for achieving a wide angle view of 130 degrees×105 degrees at a resolution of 60 pixels per degree (namely, to achieve human eye resolution). Moreover, the existing image capturing and processing technology is not well-suited for generating such HDR images along with fulfilling other requirements in XR devices, for example, such as small pixel size and high frame-rate requirements, image sensor output interface and Analog-to-Digital Converter (ADC) requirements, and Image Processing System (IPS) data throughput. Resultantly, generated images lack requisite visual quality, are often generated with considerable latency/delay, thereby leading to a poor, non-immersive viewing experience for a user.

Therefore, in light of the foregoing discussion, there exists a need to overcome the aforementioned drawbacks.

SUMMARY

The present disclosure seeks to provide an imaging system and a method to generate images having high dynamic range (HDR) characteristics, for a wide field of view at a relatively high framerate. The aim of the present disclosure is achieved by an imaging system and a method which incorporate simultaneous subsampling and HDR imaging in multi-camera systems, as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

BRIEF DESCRIPTION OF THE DRAWINGS

FIGS. 9A and 9B illustrate exemplary ways in which a given subsampling mask indicates colours of pixels using spatial pixel codes, in accordance with an embodiment of the present disclosure; and FIG. 10A illustrates an exemplary colour filter array (CFA) pattern of a given image sensor indicated by a given subsampling mask, while FIG. 10B illustrates an exemplary way in which a portion of the given subsampling mask indicates colours in a smallest repeating 4×4 array in the given image sensor using different spatial pixel codes, in accordance with an embodiment of the present disclosure.

DETAILED DESCRIPTION OF EMBODIMENTS

Figure 1:
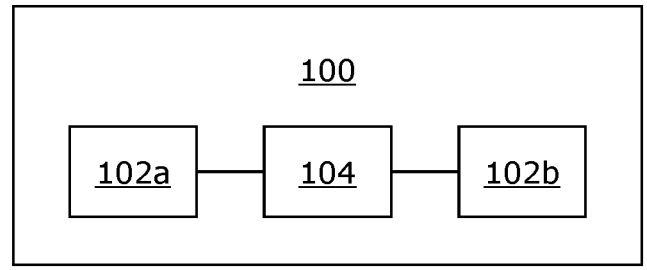
FIG. 1 illustrates a block diagram of an architecture of an imaging system incorporating simultaneous subsampling and high dynamic range imaging in multi-camera systems, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides an imaging system comprising:
 a first image sensor and at least one second image sensor that are to be employed to capture at least one first image and at least one second image, respectively, using at least two different settings pertaining to at least one of: an exposure time, a sensitivity, an aperture size; and
 at least one processor configured to:
   obtain, from the first image sensor and the at least one second image sensor, first image data and second image data corresponding to the at least one first image and to the at least one second image, respectively, wherein the first image data comprises first subsampled image data of at least a first part of a first field of view of the first image sensor, and the first part of the first field of view comprises at least a part of an overlapping field of view between the first image sensor and the at least one second image sensor; and
   process the first image data and the second image data together, using a high dynamic range (HDR) imaging technique, to generate a first HDR image and a second HDR image, wherein, when processing, the at least one processor is configured to:
     perform interpolation and demosaicking on the first subsampled image data, by employing the second image data and using the HDR imaging technique, to generate first intermediate image data;
     perform demosaicking on the second image data, by employing the first image data and using the HDR imaging technique, to generate second intermediate image data; and
     process the first intermediate image data and the second intermediate image data, to generate the first HDR image and the second HDR image, respectively.

In a second aspect, an embodiment of the present disclosure provides a method comprising:
 capturing at least one first image and at least one second image by employing a first image sensor and at least one second image sensor, respectively, using at least two different settings pertaining to at least one of: an exposure time, a sensitivity, an aperture size;
 obtaining, from the first image sensor and the at least one second image sensor, first image data and second image data corresponding to the at least one first image and to the at least one second image, respectively, wherein the first image data comprises first subsampled image data of at least a first part of a first field of view of the first image sensor, and the first part of the first field of view comprises at least a part of an overlapping field of view between the first image sensor and the at least one second image sensor; and
 processing the first image data and the second image data together, using a high dynamic range (HDR) imaging technique, to generate a first HDR image and a second HDR image, wherein the step of processing comprises:
   performing interpolation and demosaicking on the first subsampled image data, by employing the second image data and using the HDR imaging technique, to generate first intermediate image data;
   performing demosaicking on the second image data, by employing the first image data and using the HDR imaging technique, to generate second intermediate image data; and
   processing the first intermediate image data and the second intermediate image data, to generate the first HDR image and the second HDR image, respectively.

The first HDR image and the second HDR image are generated in a manner that a combined view of the first HDR image and the second HDR image has an acceptably high visual detail (i.e., HDR characteristics) throughout a wide field of view. This is because the at least one first image and the at least one second image are captured using at least one of: different exposure times, a different sensitivities, different aperture sizes, and the image data corresponding to the aforesaid images is then processed together by performing the interpolation and/or the demosaicking, in a highly accurate and efficient manner, using the HDR imaging technique, to generate the first HDR image and the second HDR image. In other words, when processing the first image data and the second image data together, the HDR imaging technique is effectively utilised because the first image data and the second image data are captured using at least one of: different exposure times, different sensitivities, different aperture sizes, and thus the HDR imaging technique facilitates in performing a fusion of the first image data and the second image data accordingly, to generate the first HDR image and the second HDR image. Moreover, processing the first subsampled image data of the first image sensor by utilising the second image data of the at least one second image sensor (and vice versa) yields high quality images, whilst reducing computational burden, delays, and excessive power consumption. Moreover, a selective read out of the first image data also facilitates in providing a high frame rate of images. The imaging system and the method are simple, robust, support real-time and reliable simultaneous subsampling and HDR imaging, and can be implemented with ease.

Throughout the present disclosure, the term "image sensor" refers to a device that detects light from a real-world environment at its photo-sensitive surface, thereby enabling a plurality of pixels arranged on the photo-sensitive surface to capture a plurality of image signals. The plurality of image signals are electrical signals pertaining to a real-world scene of the real-world environment. The plurality of image signals constitute image data of the plurality of pixels.

Examples of a given image sensor include, but are not limited to, a charge-coupled device (CCD) image sensor, and a complementary metal-oxide-semiconductor (CMOS)

image sensor. It will be appreciated that the plurality of pixels could, for example, be arranged in a rectangular two-dimensional (2D) grid, a polygonal arrangement, a circular arrangement, an elliptical arrangement, a freeform arrangement, or the like, on the photo-sensitive surface. In an example, the given image sensor may comprise 25 megapixels arranged in the rectangular 2D grid (such as a 5000×5000 pixel grid) on the photo-sensitive surface. The term "given image sensor" encompasses the first image sensor and/or the at least one second image sensor.

Optionally, the first image sensor and the at least one second image sensor are parts of a first camera and at least one second camera, respectively, wherein the first camera and the at least one second camera are employed to capture the at least one first image and the at least one second image, respectively. The at least one first image and the at least one second image together represent a same real-world scene of the real-world environment, but are slightly offset with respect to each other, owing to slightly different fields of view being captured in the at least one first image and the at least one second image. The overlapping field of view of between the first image sensor and the at least one second image sensor corresponds to a portion of the real-world scene that is captured both by the first camera and the at least one second camera.

In an implementation, the at least one second camera comprises a single second camera having a single second image sensor. In such an implementation, the first camera and the single second camera form a stereo pair, wherein the at least one first image is captured from a perspective of one of a left eye and a right eye of a user, whereas the at least one second image is captured from a perspective of another of the left eye and the right eye. In this regard, the first camera and the single second camera may be arranged to face the real-world environment in a manner that a distance between the first camera and the single second camera is equal to an interpupillary distance (IPD) between the left eye and the right eye. In an example, the distance between the first camera and the single second camera may be equal to an average IPD. It will be appreciated that in case of the stereo pair, the first image sensor and the at least one second image sensor need not necessarily be implemented as specialized HDR image sensors instead, regular image sensors could be implemented. Similarly, image signal processing (ISP) receiver need not have a specialized HDR silicon design to support HDR processing capabilities. Thus, without a need for completely relying on specialized hardware for capturing/generating HDR images, employing the at least two different settings for capturing images would be acceptably sufficient with regular cameras and ISP pipeline. It will also be appreciated that the first camera and the single second camera need not necessarily be arranged in a side-by-side manner (like in case of the stereo pair), but could be arranged in a top-to-bottom manner or in a diagonal manner.

Moreover, in another implementation, the at least one second camera comprises two second cameras, each second camera having a second image sensor. In such an implementation, the first camera and the two second cameras form a triple camera system. In yet another implementation, the at least one second camera comprises three second cameras, each second camera having a respective second image sensor. In such an implementation, the first camera and the three second cameras form a quad camera system.

It will be appreciated that a given camera could, for example, be arranged anywhere in the real-world environment where a user is present, or could be arranged on a teleport device present in the real-world environment, or could be arranged on a client device worn by the user on his/her head. The term "teleport device" refers to a specialized equipment that is capable of facilitating virtual teleportation. The term "client device" refers to a specialized equipment that is capable of at least displaying a given image. Optionally, the at least one processor of the imaging system is communicably coupled with a processor of the client device. Optionally, the client device is implemented as a head-mounted display (HMD) device. The term "head-mounted display" device refers to a specialized equipment that is configured to present an extended-reality (XR) environment to the user when said HMD device, in operation, is worn by the user on his/her head. The HMD device is implemented, for example, as an XR headset, a pair of XR glasses, and the like, that is operable to display a visual scene of the XR environment to the user. The term "extended-reality" encompasses augmented reality (AR), mixed reality (MR), and the like. The term "given camera" encompasses the first camera and/or the second camera.

Optionally, the given camera is implemented as a visible-light camera. Examples of the visible-light camera include, but are not limited to, a Red-Green-Blue (RGB) camera, a Red-Green-Blue-Alpha (RGB-A) camera, a Red-Green-Blue-Depth (RGB-D) camera, an event camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. Additionally, optionally, the given camera is implemented as a depth camera. Examples of the depth camera include, but are not limited to, a Time-of-Flight (ToF) camera, a light detection and ranging (LiDAR) camera, a Red-Green-Blue-Depth (RGB-D) camera, a laser rangefinder, a stereo camera, a plenoptic camera, an infrared (IR) camera, a ranging camera, a Sound Navigation and Ranging (SONAR) camera. The given camera is optionally implemented as a combination of the visible-light camera and the depth camera.

Optionally, a given image sensor comprises a Bayer colour filter array (CFA) arranged in front of a plurality of pixels of its photosensitive surface. Such a Bayer CFA could be one of: a 4C Bayer CFA (also referred to as "quad" or "tetra", wherein a group of 2×2 pixels has a same colour), a 9C Bayer CFA (also referred to as "nona", wherein a group of 3×3 pixels has a same colour), a 16C Bayer CFA (also referred to as "hexadeca", wherein a group of 4×4 pixels has a same colour). As an example, a given camera may have an image sensor having 576 million pixels, wherein 2×2 grids, 3×3 grids or even 4×4 grids of pixels of a same colour can be binned to form a single super pixel. As another example, the RGB-IR camera can be a 2×2 pattern-based RGB-IR camera, a 4×4 pattern-based RGB-IR camera, or similar. Alternatively or additionally, optionally, the given image sensor comprises a multispectral filter arranged in front of the plurality of pixels. Herein, the term "multispectral filter" refers to a type of filter that is capable of selectively transmitting or blocking certain wavelengths of the light incident upon the given image sensor, thereby allowing only specific wavelengths of the light to pass therethrough. The multispectral filter is capable of filtering the light in a wider range of colours (for example, in 16 different colours or even more), as compared to traditional 3-5 colour filters used in any of the aforementioned visible-light cameras. The multispectral filters are well-known in the art.

Throughout the present disclosure, the term "image" refers to a visual representation of the real-world environment. The term "visual representation" encompasses colour information represented in a given image, and additionally optionally other attributes associated with the given image (for example, such as depth information, luminance information, transparency information (namely, alpha values), polarization information, and the like).

Notably, the at least one first image and the at least one second image are captured using the at least two different settings. In other words, the at least one first image and the at least one second image are captured using at least one of: different exposure times, different sensitivities, different aperture sizes. It will be appreciated that using the at least two different settings for capturing the aforesaid images facilitates in subsequently generating HDR images (as discussed later).

The term "exposure time" refers to a time span for which the photo-sensitive surface of the given image sensor is exposed to light, so as to capture a given image of the real-world scene of the real-world environment. Furthermore, the term "sensitivity" refers to a measure of how strongly the photo-sensitive surface of the given image sensor responds when exposed to the light, so as to capture a given image of the real-world scene of the real-world environment. Greater the sensitivity of the given image sensor, lesser is an amount of light required to capture the given image, and vice versa. Typically, the sensitivity of the given camera is expressed in terms of ISO levels, for example, such as lying in a range of ISO 100 to ISO 6400. It will be appreciated that different sensitivities could be obtained by the given camera by changing (namely, altering) analog gain and/or digital gain of the given camera. A gain of the given camera refers to a gain of a charge amplifier of the given image sensor of the given camera, wherein said charge amplifier is employed while reading out charge values from pixels of the given image sensor through analog to digital conversion. Techniques and algorithms for changing the analog gain and/or the digital gain of the given camera (in image signal processing) are well-known in the art. Moreover, the term "aperture size" refers to a size of an opening present in a given camera through which the light emanating from the real-world environment enters the given camera, and reaches the photo-sensitive surface of the given image sensor of the given camera. The aperture size is adjusted to control an amount of light that is allowed to enter the given camera, when capturing a given image of the real-world scene of the real-world environment. Typically, the aperture size of the given camera is expressed in an F-number format. Larger the aperture size, smaller is the F-number used for capturing images, and narrower is the depth-of-field captured in the images. Conversely, smaller the aperture size, greater is the F-number used for capturing images, and wider is the depth-of-field captured in the images. The F-number could, for example, be F/1.0, F/1.2, F/1.4, F/2.0, F/2.8, F/4.0, F/5.6, F/8.0, F/11.0, F/16.0, F/22.0, F/32.0, and the like. Aperture sizes and their associated F-numbers are well-known in art.

Notably, the at least one processor controls an overall operation of the imaging system. The at least one processor is communicably coupled to the given image sensor. Optionally, the at least one processor is implemented as an image signal processor. In an example, the image signal processor may be a programmable digital signal processor (DSP).

Alternatively, optionally, the at least one processor is implemented as a cloud server (namely, a remote server) that provides a cloud computing service.

Throughout the present disclosure, the term "image data" refers to information pertaining to a given pixel arranged on the photo-sensitive surface of the given image sensor, wherein said information comprises one or more of: a colour value of the given pixel, a depth value of the given pixel, a transparency value of the given pixel, a luminance value of the given pixel. In some implementations, the image data is RAW image data that has been read out from the given image sensor. The term "RAW image data" refers to image data that is unprocessed (or may be minimally processed) when obtained from the given image sensor. The RAW form of image data is well-known in the art. In other implementations, the image data is partially-processed image data that is generated upon performing certain ISP on the RAW image data, for example, in an ISP pipeline.

Notably, when the first subsampled image data is collected by the first image sensor, it means that the first image sensor reads out only some pixels from at least a portion of a photo-sensitive surface of the first image sensor (that corresponds to at least the first part of the first field of view of the first image sensor), instead of reading out each and every pixel from at least the portion of the photo-sensitive surface. Thus, when selectively reading out the first subsampled image data, image signals captured by only some pixels of said portion of the photo-sensitive surface are processed. Optionally, when the plurality of pixels are arranged in the rectangular 2D grid on the photo-sensitive surface of the given image sensor, the given image sensor is configured to read out given image data in a line-by-line manner. The term "given image data" encompasses the first image data and/or the second image data.

It will be appreciated that such a selective read out of the first subsampled image data facilitates in providing a high frame rate of images. This is because a processing time for selectively reading out the given subsampled image data and generating image data of remaining unread pixels of said portion of the photo-sensitive surface of the given image sensor, is considerably lesser as compared to a processing time for reading out image data from each and every pixel of said portion of the photo-sensitive surface. Therefore, in a given time duration, a higher number of images could be captured and displayed when the first image data is selectively read out, as compared to when image data from all pixels in said portion of the photo-sensitive surface is to be read out. The frame rate could be expressed in terms of frames per second (FPS), and may, for example, be 60 FPS, 90 FPS, 120 FPS, or higher. It will also be appreciated that subsampling of the given image data could either be performed during reading out from the given image sensor, or be performed prior to conversion of RAW image data into a given colour space format (for example, such as RGB format, Luminance and two-colour differences (YUV) format, or the like) in the ISP pipeline. Both of the aforesaid ways of subsampling are well-known in the art.

Further, the second image data optionally comprises second sampled image data of a second field of view of the at least one second image sensor. This means that the at least one second image sensor reads out each of a plurality of pixels arranged on a photo-sensitive surface of the at least one second image sensor. Thus, when reading out the second sampled image data, image signals captured by each and every pixel of the photo-sensitive surface of the at least one second image sensor are processed.

Optionally, the HDR imaging technique comprises at least one of: an HDR tone-mapping technique, an HDR exposure bracketing technique, an HDR exposure fusion technique, a dual ISO technique, an edge-preserving filtering technique (for example, such as a guided image filtering technique). The aforesaid HDR imaging techniques and their utilisation for generating HDR images are well-known in the art. The HDR exposure fusion technique is described, for example, in "*Exposure Fusion*" by T. Mertens et al., published in 15th Pacific Conference on Computer Graphics and Applications (PG'07), pp. 382-390, 2007, which has been incorporated herein by reference. The guided image filtering technique is described, for example, in "*Image Fusion with Guided Filtering*" by Shutao Li et al., published in IEEE Transactions on Image Processing, Vol. 22, No. 7, pp. 2864-2875 July 2013, which has been incorporated herein by reference. It will also be appreciated that when the first image data is processed (as discussed hereinbelow), the second image data is utilised along with the HDR imaging technique, while when the second image data is processed (as discussed hereinbelow), the first image data is utilised along with the HDR imaging technique. In this regard, prior to utilising the second image data, the at least one processor may perform reprojection on the second image data, based on a difference between a pose of the first image sensor from perspective of which the at least one first image is captured and a pose of the at least one second image sensor from perspective of which the at least one second image is captured. Similarly, prior to utilising the first image data, the at least one processor may perform reprojection on the first image data, based on the aforesaid difference. Reprojection and its techniques are well-known in the art.

Notably, the interpolation is performed on image data of read pixels in the first subsampled image data to generate image data of remaining unread/missed pixels in the first subsampled image data. In this regard, image data of at least some remaining unread pixels in the first subsampled image data is easily obtained by using the second image data, for example, depending on an extent to which a subsampling pattern according to which the second image data is obtained complements a subsampling pattern according to which the first image data is obtained. Information pertaining to subsampling patterns will be discussed later. Moreover, the "interpolation" is a specialized process of reconstructing image data of some pixels in the given subsampled image data by using image data read out from other neighbouring pixels in the given subsampled image data. The interpolation is required because the first image data is subsampled. The interpolation is well-known in the art. It will be appreciated that when the second image data does not comprise any subsampled image data, the interpolation is not required to be performed on the second image data, and thus the demosaicking is directly performed on the second image data.

Optionally, the interpolation is performed by employing at least one interpolation filtering algorithm. Optionally, the at least one interpolation filtering algorithm is at least one of: a bilinear interpolation algorithm, an edge-directed weighted-sum interpolation algorithm, a weighted sum interpolation algorithm, a local colour ratio (LCR) algorithm, a median-based interpolation algorithm, an average-based interpolation algorithm, a linear interpolation filtering algorithm, a cubic interpolation filtering algorithm, a four-nearest-neighbours interpolation filtering algorithm, a natural-neighbour interpolation filtering algorithm, a steering kernel regression interpolation filtering algorithm. The aforesaid interpolation filtering algorithms are well-known in the art.

Upon performing the interpolation, the demosaicking is performed on the first subsampled image data for generating the first intermediate image data comprising a set of complete colour values (for example, such as RGB colour values or similar) for each pixel in the first subsampled image data. Likewise, the demosaicking is performed on the second image data for generating the second intermediate image data comprising a set of complete colour values for each pixel in the second image data. Such sets of complete colour values are subsequently utilised for generating the first HDR image and the second HDR image. In some implementations, the interpolation is performed on the given subsampled image data prior to the demosaicking. In other implementations, the demosaicking and the interpolation are combined as a single operation, for example, when at least one neural network is to be employed (by the at least one processor) for performing the demosaicking and the interpolation (as discussed later). Some of the aforesaid interpolation filtering algorithms could also be used for performing the demosaicking.

Optionally, when processing the first intermediate image data and the second intermediate image data to generate the first HDR image and the second HDR image, respectively, the at least one processor is configured to employ at least one image processing technique. Apart from the HDR imaging technique, the at least one image processing algorithm could include at least one of: an image denoising technique, an image sharpening technique, a colour conversion technique, an auto white balancing technique, a deblurring algorithm, a contrast enhancement algorithm, a low-light enhancement algorithm, a tone mapping algorithm, a super-resolution algorithm, an image compression algorithm. Such image processing techniques are well-known in the art. It will be appreciated that such a manner of processing the first image data and the second image data together facilitates in generating first HDR images and second HDR images that are accurate and realistic, and have high visual detail (i.e., with HDR characteristics). In other words, image qualities of the first HDR images and the second HDR images so generated emulates image viewing quality and characteristics of human visual system. Moreover, a combined view of the first HDR image and the second HDR image covers a wide field of view of the real-world environment, and has an acceptably high visual detail (for example, in terms of high resolution) throughout a wide field of view.

Optionally, the second image data comprises second subsampled image data of at least a second part of a second field of view of the at least one second image sensor, the second part of the second field of view comprises at least the part of the overlapping field of view between the first image sensor and the at least one second image sensor. In this regard, when the second subsampled image data is collected by the at least one second image sensor, it means that the at least one second image sensor reads out only some pixels from at least a portion of the photo-sensitive surface of the at least one second image sensor (that corresponds to at least the second part of the second field of view of the at least one second image sensor), instead of reading out each and every pixel from at least the portion of said photo-sensitive surface. Such a selective read out of the second subsampled image data facilitates in providing a high frame rate of images.

Optionally, when the second image data comprises the second subsampled image data, the at least one processor is configured to process the second subsampled image data by performing interpolation and demosaicking on the second subsampled image data, by employing the first image data and using the HDR imaging technique, to generate the second intermediate image data. It will be appreciated that the interpolation is performed on image data of read pixels in the second subsampled image data to generate image data of remaining unread/missed pixels in the second subsampled image data. In this regard, image data of at least some remaining unread pixels in the second subsampled image data is easily obtained by using the first subsampled image data, depending on an extent to which the subsampling pattern of the first image data complements the subsampling pattern of the second image data.

It will be appreciated that the overlapping field of view between the first image sensor and the at least one second image sensor represents a region in the real-world environment that lies in both the first field of view and the second field of view. This means that objects or their portions present in said region would be visible from the first field of view and the second field of view, and thus image signals pertaining to such objects or their portion would be captured by at least some pixels corresponding to the first part of the first field of view as well as by at least some pixels corresponding to the second part of the second field of view. It will be appreciated that the phrase "at least a part of an overlapping field of view" means that it is not necessary that an entirety of the overlapping field of view is subsampled in the first image data and the second image data. Thus, it may be possible that: (i) the part of the overlapping field of view could pertain to a gaze region of the given field of view only, or (ii) the part of the overlapping field of view could pertain to a peripheral region of the given field of view only.

Optionally, the first subsampled image data is subsampled according to a first subsampling pattern, and the second subsampled image data is subsampled according to a second subsampling pattern that is different from the first subsampling pattern. Throughout the present disclosure, the term "subsampling pattern" refers to a software-based masking pattern that enables in selectively reading out pixels from the given image sensor. In this regard, pixels whose locations are indicated in a given subsampling pattern as skipped are not read out from the given image sensor (and thus image data for such pixels is not obtained), while pixels whose locations are indicated in the given subsampling pattern as not skipped are read out from the given image sensor (and thus image data for such pixels is obtained). The given subsampling pattern may be utilised to provide a predetermined selection criterion for subsampling image data during the read out from the given image sensor. Optionally, the given subsampling pattern is a bit mask, wherein '0' indicates a pixel to be skipped and '1' indicates a pixel to be read out. The term "given subsampling pattern" encompasses the first subsampling pattern and/or the second subsampling pattern.

It will be appreciated that the given subsampling pattern could be a non-regular pattern, wherein the non-regular pattern is a software-based masking pattern which indicates locations of irregularly-arranged (i.e., disorderly arranged) pixels in the given image sensor that are to be read out. Such pixels are not selected according to any typical or standardised spatially-regular manner, but in fact are deliberately and carefully selected in a spatially-irregular manner so as to facilitate in accurately and reliably generating image data corresponding to remaining (unread) pixels in the given image sensor. It will also be appreciated that the given subsampling pattern could alternatively be a random pattern, a gradient-type pattern, or a regular pattern.

Optionally, when the second subsampling pattern is different from the first subsampling pattern, some pixels that are read out according to the second subsampling pattern may not be read out according to the first subsampling pattern, while some other pixels that are not read out (i.e., skipped) according to the second subsampling pattern may be read out according to the first subsampling pattern. Additionally, there may also be some pixels that are either skipped or read out by both the first subsampling pattern and the second subsampling pattern. Therefore, locations of all such pixels could be indicated in the first subsampling pattern and the second subsampling pattern accordingly.

Optionally, the second subsampling pattern is fully or partially complementary to the first subsampling pattern. In this regard, in some implementations, when the second subsampling pattern is fully complementary to the first subsampling pattern, it means that the second subsampling pattern and the first subsampling pattern do not overlap with each other at all (i.e., no common pixels are read out according to both the second subsampling pattern and the first subsampling pattern), yet, when the second subsampling pattern and the first subsampling pattern are combined together, they cover an entirety of the part of the overlapping field of view. In other words, pixels that are to be read out according to the second subsampling pattern are entirely different from pixels that are to be read out according to the first subsampling pattern such that pixels that are not read out according to the second subsampling pattern, are read out according to the first subsampling pattern, and vice versa. Resultantly, full image data is read out for the entirety of the part of the overlapping field of view from both the first image sensor and the second image sensor in a combined manner. For sake of better understanding, this implementation has been illustrated in conjunction with FIGS. 4C and 4D.

In other implementations, when the second subsampling pattern is partially complementary to the first subsampling pattern, it could mean that:

(i) the second subsampling pattern and the first subsampling pattern partially overlap with each other (i.e., some common pixels are to be read out according to both the second subsampling pattern and the first subsampling pattern, in addition to pixels that are to be read out according to the second subsampling pattern and the first subsampling pattern individually), and when the second subsampling pattern and the first subsampling pattern are combined, they cover the entirety of the part of the overlapping field of view, or (ii) the second subsampling pattern and the first subsampling pattern partially overlap with each other, and when the second subsampling pattern and the first subsampling pattern are combined, they do not cover the entirety of the part of the overlapping field of view (i.e., some image data is not read out for the part of the overlapping field of view from any of the first image sensor and the second image sensor), or (iii) the second subsampling pattern and the first subsampling pattern do not overlap with each other at all, and when the second subsampling pattern and the first subsampling pattern are combined, they do not cover the entirety of the part of the overlapping field of view (i.e., some image data is not read out for the part of the overlapping field of view from any of the first image sensor and the second image sensor).

Figure 4A:
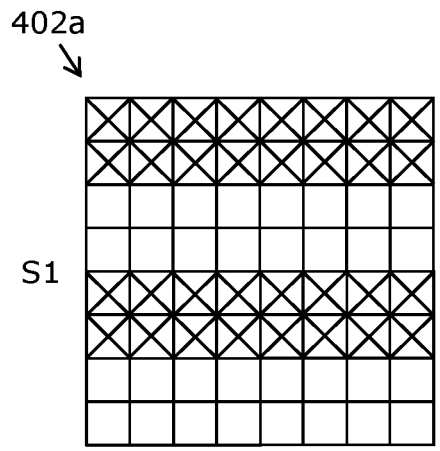
FIGS. 4A and 4B illustrate an exemplary way in which first image data corresponding to a first image, and second image data corresponding to a second image is obtained for generating high dynamic range (HDR) images, in accordance with an embodiment of the present disclosure.
Figure 4B:
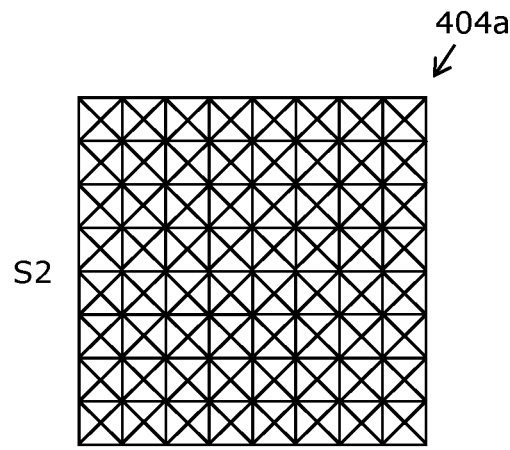

For sake of simplicity and understanding, only case (i) has been illustrated in conjunction with FIGS. 4A and 4B.

Optionally, the first image data further comprises first additional subsampled image data of a non-overlapping part of the first field of view. Moreover, optionally, a subsampling density employed for the non-overlapping part of the first field of view is higher than a subsampling density employed for the part of the overlapping field of view. In this regard, unlike the (overlapping) part of the first field of view, the non-overlapping part of the first field of view is another part of the first field of view that does not overlap with the second field of view, thus the first additional subsampled image data would only be available from the first image sensor and is to be solely utilised for processing. Therefore, in order to obtain an overall high visual quality (i.e., HDR characteristics) across the first image, a higher subsampling density is employed for the non-overlapping part of the first field of view, as compared to a subsampling density employed for the (overlapping) part of the first field of view. Beneficially, in such a case, image data corresponding to unread pixels in the first additional subsampled image data could be highly accurately and reliably generated, by using image data corresponding to (read out) pixels in the first additional subsampled image data only, so as to facilitate in producing an overall high resolution in the first image. Optionally, in this regard, the at least one processor is configured to process the first additional subsampled image data by performing interpolation and demosaicking on the first additional subsampled image data. It will be appreciated that generating the first image in the aforesaid manner takes into account parallax occlusion, wherein the first field of view does not include some portion of the second field of view, and vice versa.

Likewise, optionally, the second image data further comprises second additional subsampled image data of a non-overlapping part of the second field of view. Moreover, optionally, a subsampling density employed for the non-overlapping part of the second field of view is higher than a subsampling density employed for the part of the overlapping field of view.

Moreover, optionally, the at least one processor is configured to process the first image data and the second image data together to generate the first HDR image and the second HDR image using at least one neural network, wherein an input of the at least one neural network comprises the first image data and the second image data. In this regard, the at least one neural network is used for performing the interpolation and/or the demosaicking on the first subsampled image data, to generate the first intermediate image data, which is then processed to generate the first HDR image. Simultaneously, the at least one neural network is used for performing the interpolation and/or the demosaicking on the (subsampled and/or sampled) second image data, to generate the second intermediate image data, which is then processed to generate the second HDR image. The at least one neural network performs the interpolation and/or the demosaicking in a highly accurate manner, as compared to conventional techniques. It will be appreciated that the input (comprising the first image data and the second image data) is provided to the at least one neural network both in a training phase of the at least one neural network and in an inference phase of the at least one neural network (i.e., when the at least one neural is utilised after it has been trained). It will also be appreciated that when the at least one neural network is used, the demosaicking, the interpolation and the HDR imaging technique could be combined as a single operation, unlike in the conventional techniques where the demosaicking, the interpolation and the HDR technique are treated as separate operations and where information pertaining to linear or non-linear relationships between neighbouring pixels is necessary for performing these operations. The interpolation performed using the at least one neural network can be understood to be inpainting or hallucinating missing image data. In addition to these operations, there could be various image enhancement or image restoration operations (as mentioned hereinbelow) that can be performed additionally and optionally, using the at least one neural network. In this way, the at least one neural network may be trained to generate acceptably accurate missing image data based on available image data. These operations can even be performed at different scales or levels of detail to enhance an overall visual quality of the given image. Thus, the at least one neural network could be used for performing HDR imaging, in addition to the demosaicking and the interpolation.

Additionally, optionally, a training process of the at least one neural network involves utilising a loss function that is generated based on perceptual factors and contextual factors. Such a loss function would be different from a loss function utilised in the conventional techniques. Perceptual loss factors may relate to visual perception of the generated given image. Instead of solely considering pixel-level differences, perceptual loss factors aim to measure a similarity in terms of higher-level visual features of an image. Contextual loss factors may take into account a relationship and a coherence between neighbouring pixels in the image. By incorporating the perceptual factors and the contextual factors into the training process, the at least one neural network can produce a visually-pleasing and contextually-coherent result. It will be appreciated that the loss function of the at least one neural network could optionally also take into account various image enhancement/restoration operations beyond just the demosaicking and the interpolation; the various image enhancement/restoration operations may, for example, include at least one of: deblurring, contrast enhancement, low-light enhancement, exposure correction, tone mapping, colour conversion, white balancing, super-resolution, compression.

It will also be appreciated that since the first HDR image and the second HDR image are not to be displayed in a linear domain, a well-known u-law could be utilised to map the linear domain to a tone-mapped domain which is considerably more effective than training the at least one neural network in an HDR domain. For this, a tone-mapped image is optionally generated, for example, using following equation:

$$T(H) = \frac{\log(1 + \mu H)}{\log(1 + H)}$$

wherein T(H) refers to the tone-mapped image, and u could be, for example, equal to 5000. Based on the tone-mapped domain, a tone-mapped loss (L) could be calculated between an estimated/expected tone-mapped image T(H) and a ground truth tone-mapped image T(H'), using following equation:

$$L = \|T(H) - T(H')\|$$

When evaluating a performance of the at least one neural network and its associated loss function, it can be beneficial to compare the generated image and a ground-truth image at different scales/resolutions. This can be done to assess an image quality and a visual fidelity of the generated image across various levels of detail/resolutions. For instance, the aforesaid comparison can be made at a highest resolution, which represents an original resolution of the image. This allows for a detailed evaluation of pixel-level accuracy of the generated image. Alternatively or additionally, the aforesaid comparison can be made at a reduced resolutions, for example, such as ¼th of the original resolution. This provides an assessment of an overall perceptual quality and ability of the at least one network to capture and reproduce important visual features at coarser levels of detail also. Thus, by evaluating the loss function at different scales, more comprehensive understanding of the performance of the at least one neural network can be known. The loss function, the perceptual factors, and the contextual factors are well-known in the art.

Optionally, the input of the at least one neural network further comprises at least one first subsampling mask and at least one second subsampling mask, wherein the at least one first subsampling mask indicates pixels that are missing in the first subsampled image data, and the at least one second subsampling mask indicates pixels that are missing in the second subsampled image data. Herein, the term "subsampling mask" refers to a software-based mask that indicates pixels that are missing (namely, unread) in the given subsampled image data. In this regard, pixels whose locations are indicated in a given subsampling mask as skipped are not read out from the given image sensor. It is to be understood that when the given subsampling mask does not indicate any pixel that is missed during reading out from the given image sensor, it means that each of the plurality of pixels has been read out, i.e., the given image data is sampled. The term "given subsampling mask" encompasses the at least one first subsampling mask and/or the at least one second subsampling mask. Optionally, the given subsampling mask indicates the pixels that are missing in the given subsampled image data by way of a given subsampling pattern (that has already been described earlier in detail). It will be appreciated that the given subsampling mask could be a single mask or multiple masks (for example, such as one subsampling mask indicating a CFA pattern of the given image sensor, another subsampling mask indicating unread pixels and, optionally, read-out pixels in the given subsampled image data). It will also be appreciated that the at least one first subsampling mask and the at least one second subsampling mask provide the at least one neural network with necessary information on which pixels are missing in the first subsampled image data and which pixels are missing in the second subsampled image data, so as to facilitate in accurately and reliably generating image data corresponding to such missing pixels (by way of performing the interpolation as explained earlier).

Moreover, optionally, the given subsampling mask further indicates a CFA pattern of the given image sensor. The term "colour filter array" refers to an arrangement of colour filters in front of the plurality of pixels of the given image sensor in a manner that each pixel of the given image sensor is covered by a colour filter (for example, a red colour filter, a green colour filter, a blue colour filter, or similar) that allows only a certain wavelength of light (corresponding to a colour of the colour filter) to pass therethrough and be detected by the given image sensor. Examples of the CFA pattern include, but are not limited to, a Bayer CFA pattern, an X-Trans CFA pattern, a Tetracell CFA pattern, and a Nonacell CFA pattern. The aforesaid CFA patterns are well-known in the art. It will be appreciated that the CFA pattern represents locations of different colour pixels (for example, green colour pixels, red colour pixels, and blue colour pixels that correspond to green colour filters, red colour filters, and blue colour filters of the CFA pattern, respectively) that can be read out from the given image sensor. The CFA pattern enables the at least one neural network to perform interpolation and demosaicking.

It will also be appreciated that the given subsampling mask may be implemented as a single subsampling mask indicating an entirety of the CFA pattern, or be implemented as different subsampling masks indicating different colour filters of the CFA pattern separately. Moreover, information pertaining to the CFA pattern may be coded into a mosaic guidance matrix, wherein the different colour filters of the CFA pattern are represented using different indexing values in the mosaic guidance matrix. In an example, for a 2×2 array of RGGB pixels, indexing values 0, 1, and 2 may be used to represent a red colour filter, a green colour filter, and a blue colour filter, respectively, of the CFA pattern. One such way of indicating the CFA pattern is described, for example, in "*Demo-Net: A Low Complexity Convolutional Neural Network for Demosaicking Images*" by Mert Bektas et al., published in IEEE International Conference on Consumer Electronics, pp. 1-2, 2022, which has been incorporated herein by reference.

Moreover, optionally, the given subsampling mask further indicates at least one of:

colours of pixels that have been read out,
colours of pixels that have not been read out,
different colours using different spatial pixel codes,
repetitions of a same colour in a smallest repeating M×N array in
the given image sensor using different spatial pixel codes, different combinations of neighbouring pixels having a same colour
in the smallest repeating M×N array using different spatial pixel codes, pixels per degree of the given image data.

In this regard, by indicating the colours of pixels that have been read out and/or the colours of pixels that have not been read out in the given subsampling mask, the at least one neural network would accurately know for which pixels image data is available, and for which pixels image data is unread. Then, unread image data can be easily and accurately generated by the at least one neural network using available image data. Furthermore, using the different spatial pixel codes for indicating the colours of pixels that have been read out and that have not been read out is relatively easier and convenient to implement. Advantageously, this may also facilitate in training the at least one neural network in a time-efficient manner, and potentially reducing processing time and utilization of processing resources of the at least one processor for generating given intermediate image data.

A given spatial pixel code represents a colour of a given pixel and optionally, a spatial position of the given pixel in a smallest repeating M×N array. Pixels having same colours may or may not have a same spatial pixel code. The given spatial pixel code could, for example, be a numeric code, an alphabetic code, an alphanumeric code, and the like. In an example, a portion of the given subsampling mask may correspond to a 4×4 array of pixels, and the portion may be repeated in an entirety of the given subsampling mask. The portion of the given subsampling mask may indicate 4 pixels (for example, such as two green colour pixels, one blue colour pixel, and one red colour pixel) that have been read out from amongst 16 pixels, and may also indicate colours of such 4 pixels, using different spatial pixel codes, for example, such as '0' indicating a green colour pixel, '1' indicating a blue colour pixel, and '2' indicating a red colour pixel. One such example has been also illustrated in conjunction with FIG. 9A, for sake of better understanding. Additionally, said portion of the given subsampling mask may also indicate 12 pixels that have not been read out (namely, 12 pixels that are skipped) from amongst the 16 pixels, using a single spatial pixel code, for example, such as '3', '4', '-1', or similar. Such a single spatial pixel code only indicates that these 12 pixels have not been read out.

Alternatively, in the previous example, the portion of the given subsampling mask may indicate colours of the 4 pixels, using different spatial pixel codes, for example, such as '0' indicating a first green colour pixel, '1' indicating a blue colour pixel, '2' indicating a red colour pixel, and '3' indicating a second green colour pixel. Additionally, said portion may also indicate colours of the 12 pixels that have not been read out, using different spatial pixel codes, for example, such as '4' indicating a first unread green colour pixel, '5' indicating an unread red colour pixel, '6' indicating an unread blue colour pixel, and '7' indicating a second unread green colour pixel. Such an example has been also illustrated in conjunction with FIG. 9B, for sake of better understanding.

Additionally, optionally, when the same colour is repeated in the smallest repeating M×N array, different spatial pixel codes could be used for indicating different neighbouring pixels having the same colour in the smallest repeating M×N array. The term "smallest repeating M×N array" refers to a smallest array of pixels that is repeated in the given image sensor. The M×N array could, for example, be a 2×2 array, a 3×3 array, a 4×4 array, or similar. In an example, a portion of the given subsampling mask may indicate colours in a smallest repeating 4×4 array in the given image sensor such that 4 blue colour pixels are indicated using 4 different spatial pixel codes '1', '2', '3', and '4', respectively, 8 green colour pixels are indicated using 8 different spatial pixel codes '5', '6', '7', '8', '9', '10', '11', and '12', respectively, and 4 red colour pixels are indicated using 4 different spatial pixel codes as '13', '14', '15' and '16', respectively. Such an example has been also illustrated in conjunction with FIG. 10B, for sake of better understanding.

Additionally, optionally, two or more neighbouring pixels having the same colour in the smallest repeating M×N array are combined together to be read out as a single pixel, and thus are indicated in the given subsampling mask using a different spatial pixel code. As a result, these different spatial pixel codes indicate how a combination of certain neighbouring pixels have been read out together. Such a combination could, for example, be a horizontal combination, a vertical combination, and/or a diagonal combination. It will be appreciated that the repetitions of the same colour or the two or more neighbouring pixels having the same colour could be combined together (for example, such as using a binning technique), and thus could be indicated in the given subsampling mask using a different spatial pixel code. Said combination may occur in an analog domain (wherein, analog electrical signals of the two or more neighbouring pixels are combined prior to their conversion to digital colour values), or in a charge domain (wherein, electrical charge signals of the two or more neighbouring pixels are combined before they are read out). Beneficially, this could potentially reduce an overall number of read-outs of similar colour pixels, and thereby saving processing resources and processing time of the at least one processor. The binning technique is well-known in the art.

It will also be appreciated in an actual implementation of the at least one neural network, different spatial pixel codes may be scaled and normalized in order to optimize a performance of the at least one neural network. As an example, the different spatial pixel codes may be scaled in a range of −1 to 1 or in a range of 0 to 1. This enables to prevent numerical instability during training of the at least one neural network. As another example, the different spatial pixel codes may be scaled and normalised in a range of 0 to 255. As yet another example, the different spatial pixel codes may be scaled and normalised using floating-point precision (such as float16, float32, float64, or the like) or using integer precision (such as int8, int16, or the like). Other normalization or scaling techniques could also be possible, for example, that are based on average colour values when there are different number of colour pixels Referring to and continuing with the above example, the 2 green colour pixels having the spatial pixel codes '9' and '10' or having spatial pixel codes '9' and '12' can be combined together and be indicated in the given subsampling mask by using a different spatial pixel code '17'. Similarly, the 3 red colour pixels having the spatial pixel codes '13', '14', and '16' can be combined together and be indicated in the given subsampling mask by using a different spatial pixel code '18'. All the four red colour pixels having the spatial pixel codes '13', '14', '15', and '16' can be combined (i.e., binned/averaged) together and be indicated in the given subsampling mask by using a different spatial pixel code '19' for all the four red colour pixels.

Optionally, the input of the at least one neural network further comprises information indicative of a resolution (for example, such as in terms of pixels per degree) of the first image data and the second image data. However, when it is already known to the at least one neural network that the given image sensor reads out image data at a particular resolution, the information indicative of the resolution may not be required to be provided as the input each time.

Additionally, optionally, the pixels per degree (PPD) of the given image data could vary spatially, depending on a distortion profile of the given camera. In such a case, pixel density would also vary across a field of view of the camera. As the PPD could be a function of a pixel location, the PPD could also be indicated in the given subsampling mask by way of pixel locations. It will be appreciated that the PPD of the given image data as indicated in the given subsampling mask would facilitate the at least one neural network to conveniently and accurately process the given image data, for producing the given image. Resultantly, visual information represented in the given image (for example, colours, depths, brightness, and the like, of pixels in the full image frame) would be highly accurate and realistic. Furthermore, information pertaining to the PPD could be stacked/embedded with colour filter data. For example, when an RGGB Bayer CFA is employed, the information pertaining to the PPD may be stacked with each of four colour planes of RGGB Bayer CFA data. By stacking said information with the colour filter data, resulting output would have same spatial dimensions as colour planes of the colour filter array employed.

Furthermore, optionally, the at least one neural network is any one of: a U-net type neural network, an autoencoder, a pure Convolutional Neural Network (CNN), a Residual Neural Network (ResNet), a Vision Transformer (ViT), a neural network having self-attention layers, a generative adversarial network (GAN). It will be appreciated that a cascade of neural networks could also be employed for processing the first image data and the second image data together to generate the first HDR image and the second HDR image. As an example, three neural networks in said cascade may be employed, wherein a first neural network is a U-net type neural network that is employed for performing the interpolation, a second neural network is a U-net type neural network that is employed for performing the demosaicking, and a third neural network is a CNN that is employed for performing the HDR imaging.

It will be appreciated that conventional Bayer CFA pattern-based image sensors typically allow for skipping entire rows and/or entire columns of a Bayer CFA pattern, i.e., some pixels may not have colour information captured in those rows and/or columns, because the resulting subsampled data is still in accordance with the Bayer CFA pattern. As an example, entire rows and/or entire columns may be skipped in an alternating manner conventionally. However, such conventional image sensors do not typically support skipping rows and/or columns only partially. Pursuant to embodiments of the present disclosure, the at least one neural network could still handle such an uneven subsampling from the Bayer CFA pattern where rows and/or columns are skipped partially (for example, as shown in FIGS. 6B and 6C). This implies that the at least one neural network could potentially work with a subset of pixels from a given row and/or a given column of the Bayer CFA pattern.

In a first embodiment, the at least one first image comprises a single first image, the at least one second image comprises a single second image, and the at least two different settings comprise a first setting and a second setting at which the single first image and the single second image are captured. In this regard, the single first image could be captured using one of the first setting and the second setting, while the single second image could be captured using another of the first setting and the second setting. It will be appreciated that the at least two different settings can be changed during different cycles of generating the HDR images. Moreover, in such an implementation, the first image data corresponds to the single first image and the second image data corresponds to the single second image, wherein the at least one processor is configured to process said first image data and said second image data together in a similar manner as discussed earlier, to generate the first HDR image and the second HDR image. The technical benefit of such an implementation is that the aforesaid HDR images are generated by processing two images captured using only two different settings without reducing any frame rate (i.e., there would not be any frame rate drop). Such an implementation has been also illustrated in conjunction with FIGS. 4A and 4B and FIGS. 4C and 4D, for sake of better understanding.

In a second embodiment, the at least one first image comprises two first images, the at least one second image comprises two second images, and the at least two different settings comprise four different settings at which respective ones of the two first images and the two second images are captured. In this regard, the first image data corresponds to the two first images (i.e., more than just a single first image) and the second image data corresponds to the two second images (i.e., more than just a single second image), wherein the at least one processor is configured to process said first image data and said second image data together in a similar manner as discussed earlier, to generate the first HDR image and the second HDR image. The technical benefit of such an implementation is that the aforesaid HDR images are generated by processing four images captured using the four different settings; and a frame rate of generating such HDR images is only reduced by half as multiple image sensors (namely, the first image sensor and the at least one second image sensor) are utilised for capturing such images, which otherwise would have been reduced by one-fourth when only a single image sensor would be utilised for capturing said images.

It will be appreciated that the four different settings can be changed during different cycles of generating the HDR images. Moreover, the settings can be changed alternatingly between the first image sensor and the at least one second image sensor. As an example, in one cycle, settings S1 and S2 may be used to capture two first images, while settings S3 and S4 may be used to capture two second images; in another cycle, the settings S3 and S4 may be used to capture two first images, while the settings S1 and S2 may be used to capture two second images.

In a third embodiment, in an $N^{th}$ cycle of generating HDR images, the at least one first image comprises a single first image, the at least one second image comprises two second images, and the at least two different settings comprise three different settings at which respective ones of the single first image and the two second images are captured, wherein the single first image and the two second images are processed together to generate the first HDR image and the second HDR image in the $N^{th}$ cycle, and in an $N+1^{th}$ cycle of generating the HDR images, the at least one first image comprises two first images, the at least one second image comprises a single second image, and the at least two different settings comprise three different settings at which respective ones of the two first images and the single second image are captured, wherein the two first images and the single second image are processed together to generate the first HDR image and the second HDR image in the $N+1^{th}$ cycle.

In this regard, in the $N^{th}$ cycle of generating the HDR images, the first image data corresponds to the single first image and the second image data corresponds to the two second images, wherein the at least one processor is configured to process said first image data and said second image data together in a similar manner as discussed earlier, to generate the first HDR image and the second HDR image in the $N^{th}$ cycle. Likewise, in the $N+1^{th}$ cycle of generating the HDR images, the first image data corresponds to the two first images and the second image data corresponds to the single second image, wherein the at least one processor is configured to process said first image data and said second image data together in a similar manner as discussed earlier, to generate the first HDR image and the second HDR image in the $N+1^{th}$ cycle. The technical benefit of such an implementation is that the aforesaid HDR images (in each cycle) are generated by processing three images captured using the three different settings; and a frame rate of generating such HDR images is only reduced by one-third, because multiple image sensors are utilised for capturing such images, and an alternating manner of utilisation of such images for HDR imaging. Otherwise, the frame rate would have been reduced by two-third when only a single image sensor would be utilised for capturing said images.

In an example, in the $N^{th}$ cycle, a setting S1 may be used to capture the single first image, while settings S2 and S3 may be used to capture the two second images. Moreover, in the $N+1^{th}$ cycle, the settings S2 and S3 may be used to capture the two first images, while the setting S1 may be used to capture the single second image. Such an example has been also illustrated in conjunction with FIGS. 6A-C and 6D-F, for sake of better understanding. It will be appreciated that the three different settings need not be the same throughout each cycle, and can be changed during different cycles of generating the HDR images.

In a fourth embodiment, the at least one first image comprises a single first image, the at least one second image comprises a single second image, wherein the single first image is captured by employing the at least two different settings in a first stripe-wise varying manner, the single second image is captured by employing the at least two different settings in a second stripe-wise varying manner, wherein stripes of the single first image and stripes of the single second image are processed together to generate the first HDR image and the second HDR image.

In this regard, when a given image is captured by employing the at least two different settings in a given stripe-wise varying manner, different stripes of pixels arranged on the photosensitive surface of the given image sensor are read out at different settings from amongst the at least two different settings. As an example, when two different settings are be employed, stripes (of pixels) of the given image could be read out at the two different settings in an alternating manner. Thus, image data of some pixels of the given image sensor is obtained according to a given setting, while image data of remaining pixels of the given image sensor is obtained according to other given setting(s). The phrase "stripe-wise varying manner" refers to a variation of the different settings (i.e., an order or a sequence in which the different settings vary) along the different stripes of pixels of the given image, when capturing the given image. One such way of capturing an image is described, for example, in "*Deep Joint Demosaicing and High Dynamic Range Imaging Within a Single Shot*" by Yilun Xu et al., published in IEEE Transactions on Circuits and Systems for Video Technology, Vol. 32, No. 7, pp. 4255-4270 July 2022, which has been incorporated herein by reference.

It will be appreciated that when the given image data is read out in a stripe-by-stripe manner (for example, such as when the plurality of pixels are arranged in a rectangular 2D grid), a given stripe may comprise one or more scanlines of pixels. Moreover, width of the stripes could also vary across the given image i.e., when capturing the given image, different stripes of pixels may have different numbers of scanlines, and hence different widths. Furthermore, when the given image data (corresponding to the given image) is subsampled, there may be some stripes (or their portions) that are not read at all. It will also be appreciated that the given stripe could be a vertical stripe or a horizontal stripe. In case of vertical stripes of the given image, the at least two different settings vary in a column-wise manner, whereas in case of horizontal stripes of the given image, the at least two different settings vary in a row-wise manner. Both the stripes of the single first image and the stripes of the single second image could either be vertical stripes or be horizontal stripes. This may facilitate in processing the aforesaid stripes together in a consistent manner, for generating the first HDR image and the second HDR image. Moreover, a number of the stripes in the single first image need not be equal to a number of the stripes in the single second image.

There will now be considered an example of 64 pixels arranged in an 8×8 grid, for the sake of simplicity. In such a case, there could be four stripes such that a first stripe comprises first three scanlines of pixels in the 8×8 grid, a second stripe comprises a fourth scanline of pixels in the 8×8 grid, a third stripe comprises both a fifth scanline and a sixth scanline of pixels in the 8×8 grid, and a fourth stripe comprises both a seventh scanline and an eighth (i.e., a last) scanline of pixels in the 8×8 grid. In such an example, a setting S1 may be used for reading pixels of the second stripe and pixels of the fourth stripe, whereas a setting S2 may be used for reading pixels of the first stripe and pixels of the third stripe. Furthermore, widths of the first stripe, the second stripe, the third stripe, and the fourth stripe are equal to a size of three pixels, a size of one pixel, a size of two pixels, and a size of two pixels, respectively. Such an example has been also illustrated in conjunction with FIG. 8A, for sake of better understanding.

Optionally, according to the aforesaid fourth embodiment, the first image data corresponds to the stripes of the single first image and the second image data corresponds to the stripes of the single second image, wherein the at least one processor is configured to process said first image data and said second image data together in a similar manner as discussed earlier, to generate the first HDR image and the second HDR image. The technical benefit of such an implementation is that the aforesaid HDR images are generated by processing two images captured using different settings without reducing any frame rate, because multiple image sensors are utilised for capturing such images, and stripe-wise varying settings are employed for capturing such images for HDR imaging.

Optionally, the first stripe-wise varying manner is fully or partially complementary to the second stripe-wise varying manner. In this regard, in some implementations, when the first stripe-wise varying manner is fully complementary to the second stripe-wise varying manner, it means that an order in which the at least one two different settings vary along the stripes of the single first image (according to the first stripe-wise varying manner) does not overlap with an order in which the at least one two different settings vary along the stripes of the single second image. In other words, stripes (of pixels) of both the single first image and the single second image are read out according to the at least two different settings in a manner that corresponding stripes of the single first image and the single second image are read out according to respective ones of the at least two different settings. Beneficially, such a combination of the first stripe-wise varying manner and the second stripe-wise varying manner facilitates in obtaining an overall image data at each setting from amongst the least one two different settings. It will be appreciated that for the first stripe-wise varying manner and the second stripe-wise varying manner to be fully complementary, a same number of different settings are to be employed for capturing both the single first image and the single second image, and a number of the stripes of the single first image is equal to a number of the stripes of the single second image.

In an example, when two different settings (namely, a first setting S1 and a second setting S2) are employed, 8 stripes of the single first image may be read out in a sequence: S1, S2, S1, S2, S1, S2, S1, S2, whereas 8 stripes of the single second image may be read out in a sequence: S2, S1, S2, S1, S2, S1, S2, S1. For sake of better understanding, this implementation has been illustrated in conjunction with FIGS. 7A and 7B.

In other implementations, when the first stripe-wise varying manner is partially complementary to the second stripe-wise varying manner, it means that an order in which the at least one two different settings vary along the stripes of the single first image (according to the first stripe-wise varying manner) partially overlaps with an order in which the at least one two different settings vary along the stripes of the single second image.

In one case, for the first stripe-wise varying manner to be partially complementary to the second stripe-wise varying manner, different settings employed for capturing the single first image could be the same as different settings employed for capturing the single second image. In an example, when two different settings (namely, a first setting S1 and a second setting S2) are employed, 8 stripes of the single first image may be read out in a sequence: S1, S2, S1, S2, S1, S2, S1, S2, whereas 8 stripes of the single second image may be read out in a sequence: S2, S2, S1, S1, S2, S2, S1, S1.

In another case, for the first stripe-wise varying manner to be partially complementary to the second stripe-wise varying manner, different settings employed for capturing the single first image are not entirely the same as different settings employed for capturing the single second image. In such case, only some stripes (of pixels) of the single first image and some stripes (of pixels) of the single second image are read out using a same/common setting. In an example, when three different settings (namely, a first setting S1, a second setting S2, and a third setting S3) are employed, 8 stripes of the single first image may be read out in a sequence: S1, S2, S1, S2, S1, S2, S1, S2, whereas 8 stripes of the single second image may be read out in a sequence: S2, S3, S2, S3, S2, S3, S2, S3. For sake of better understanding, this implementation has been illustrated in conjunction with FIGS. 7C and 7D.

In a fifth embodiment, the at least one first image comprises a single first image, the at least one second image comprises a single second image, the at least two different settings comprise three different settings, wherein the single first image is captured by employing a first setting and a second setting from amongst the three different settings in a stripe-wise varying manner, while the single second image is captured by employing a third setting from amongst the three different settings, wherein the single second image is processed together with stripes of the single first image to generate the first HDR image and the second HDR image.

In this regard, the first image data corresponds to the stripes of the single first image and the second image data corresponds to the single second image, wherein the at least one processor is configured to process said first image data and said second image data together in a similar manner as discussed earlier, to generate the first HDR image and the second HDR image. For sake of better understanding, this implementation has been illustrated in conjunction with FIGS. 8A and 8B. The stripe-wise varying manner has already been discussed earlier in detail. The technical benefit of such an implementation is that the aforesaid HDR images are generated by processing two images captured using the three different settings without reducing any frame rate, because multiple image sensors are utilised for capturing such images, and stripe-wise varying setting are employed for capturing one of such images for HDR imaging. It will be appreciated that the aforesaid manner of capturing the single first image using a stripe-wise varying manner and the single second image and then processing these images could be performed in an Mth cycle of generating HDR images. On the other hand, in an M+1$^{th}$ cycle of generating the HDR images, a single first image could be captured by employing any of the three different settings, while the single second image could be captured by employing remaining ones of the three different settings in a stripe-wise varying manner, wherein the single first image is processed together with stripes of the single second image to generate the first HDR image and the second HDR image.

The present disclosure also relates to the method as described above. Various embodiments and variants disclosed above, with respect to the aforementioned imaging system, apply mutatis mutandis to the method.

Optionally, in the method, the second image data comprises second subsampled image data of at least a second part of a second field of view of the at least one second image sensor, the second part of the second field of view comprises at least the part of the overlapping field of view between the first image sensor and the at least one second image sensor. Optionally, the first subsampled image data is subsampled according to a first subsampling pattern, and the second subsampled image data is subsampled according to a second subsampling pattern that is different from the first subsampling pattern. Moreover, optionally, the second subsampling pattern is fully or partially complementary to the first subsampling pattern.

Optionally, in the method, the step of processing the first image data and the second image data together to generate the first HDR image and the second HDR image is performed using at least one neural network, wherein an input of the at least one neural network comprises the first image data and the second image data.

In an embodiment, in the method, the at least one first image comprises two first images, the at least one second image comprises two second images, and the at least two different settings comprise four different settings at which respective ones of the two first images and the two second images are captured.

In another embodiment, in an N$^{th}$ cycle of generating HDR images, the at least one first image comprises a single first image, the at least one second image comprises two second images, and the at least two different settings comprise three different settings at which respective ones of the single first image and the two second images are captured, wherein the step of processing the first image data and the second image data further comprises processing the single first image and the two second images together, to generate the first HDR image and the second HDR image in the N$^{th}$ cycle, and in an N+1$^{th}$ cycle of generating the HDR images, the at least one first image comprises two first images, the at least one second image comprises a single second image, and the at least two different settings comprise three different settings at which respective ones of the two first images and the single second image are captured, wherein the step of processing the first image data and the second image data further comprises processing the two first images and the single second image together to generate the first HDR image and the second HDR image in the N+1$^{th}$ cycle.

In yet another embodiment, the at least one first image comprises a single first image, the at least one second image comprises a single second image, wherein the single first image is captured by employing the at least two different settings in a first stripe-wise varying manner, while the single second image is captured by employing the at least two different settings in a second stripe-wise varying manner, and wherein the step of processing the first image data and the second image data further comprises processing stripes of the single first image and stripes of the single second image together, to generate the first HDR image and the second HDR image. Optionally, in the method, the first stripe-wise varying manner is fully or partially complementary to the second stripe-wise varying manner.

In still another embodiment, the at least one first image comprises a single first image, the at least one second image comprises a single second image, the at least two different settings comprise three different settings, wherein the single first image is captured by employing a first setting and a second setting from amongst the three different settings in a stripe-wise varying manner, while the single second image is captured by employing a third setting from amongst the three different settings, and wherein the step of processing the first image data and the second image data further comprises processing the single second image and stripes of the single first image together, to generate the first HDR image and the second HDR image.

DETAILED DESCRIPTION OF THE DRAWINGS

Referring to FIG. 1, illustrated is a block diagram of an architecture of an imaging system 100 incorporating simultaneous subsampling and high dynamic range imaging, in accordance with an embodiment of the present disclosure. The imaging system 100 comprises a first image sensor 102a, at least one second image sensor (depicted as a second image sensor 102b), and at least one processor (depicted as a processor 104). The processor 104 is communicably coupled with the first image sensor 102a and the second image sensor 102b. The processor 104 is configured to perform various operations, as described earlier with respect to the aforementioned first aspect.

It may be understood by a person skilled in the art that the FIG. 1 includes a simplified architecture of the imaging system 100 for sake of clarity, which should not unduly limit the scope of the claims herein. It is to be understood that the specific implementation of the imaging system 100 is provided as an example and is not to be construed as limiting it to specific numbers or types of image sensors and processors. The person skilled in the art will recognize many variations, alternatives, and modifications of embodiments of the present disclosure.

Figure 2:
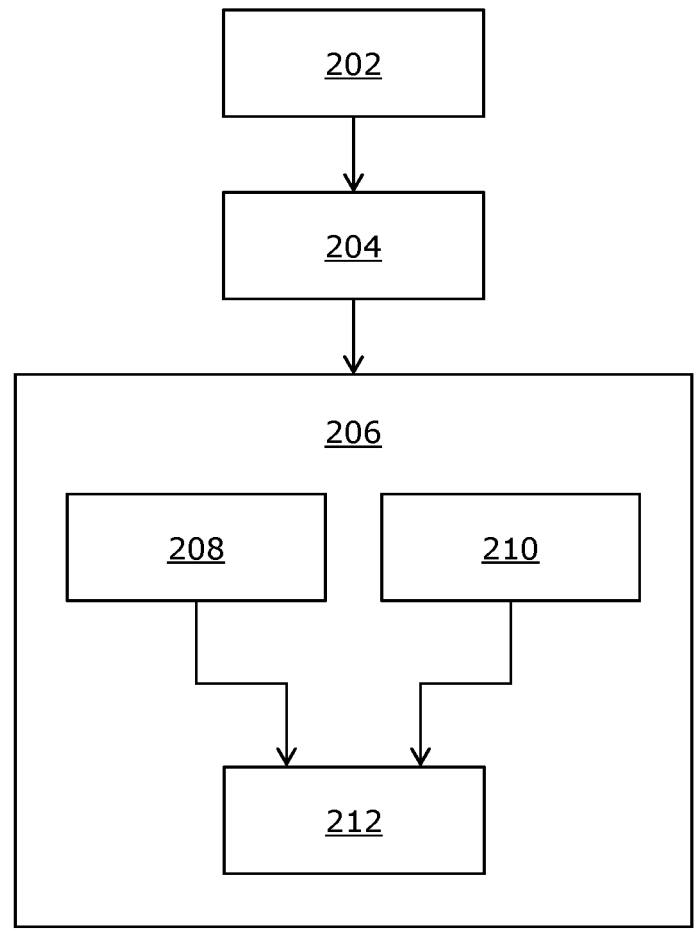
FIG. 2 illustrates steps of a method incorporating simultaneous subsampling and high dynamic range imaging in multi-camera systems, in accordance with an embodiment of the present disclosure.

Referring to FIG. 2, illustrated are steps of a method incorporating simultaneous subsampling and high dynamic range imaging in multi-camera systems, in accordance with an embodiment of the present disclosure. At step 202, at least one first image and at least one second image are captured by employing a first image sensor and at least one second image sensor, respectively, using at least two different settings pertaining to at least one of: an exposure time, a sensitivity, an aperture size. At step 204, first image data and second image data corresponding to the at least one first image and to the at least one second image is obtained from the first image sensor and the at least one second image sensor, respectively, wherein: the first image data comprises first subsampled image data of at least a first part of a first field of view of the first image sensor, and the first part of the first field of view comprises at least a part of an overlapping field of view between the first image sensor and the at least one second image sensor. At step 206, the first image data and the second image data are processed together, using a high dynamic range (HDR) imaging technique, to generate a first HDR image and a second HDR image. Step 206 comprises steps 208, 210, and 212. In this regard, at step 208, interpolation and demosaicking are performed on the first subsampled image data, by employing the second image data and using the HDR imaging technique, to generate first intermediate image data. Simultaneously, at step 210, demosaicking is performed on the second image data, by employing the first image data and using the HDR imaging technique, to generate second intermediate image data. At step 212, the first intermediate image data and the second intermediate image data are processed, to generate the first HDR image and the second HDR image, respectively.

The aforementioned steps are only illustrative and other alternatives can also be provided where one or more steps are added, one or more steps are removed, or one or more steps are provided in a different sequence without departing from the scope of the claims.

Referring to FIGS. 3A, 3B, 3C, and 3D, illustrated is an exemplary way of performing interpolation on subsampled image data of a part of a field of view of an image sensor, in accordance with an embodiment of the present disclosure. As shown, the part of the field of view of the image sensor corresponds to a portion 300 of a photo-sensitive surface of the image sensor. The portion 300 is shown to comprise 64 pixels arranged in an 8×8 grid, for the sake of simplicity and clarity. In FIGS. 3A-3D, said interpolation is performed to generate image data corresponding to remaining (i.e., unread) pixels in the portion 300 using image data corresponding to read pixels in the portion 300.

Figure 3A:
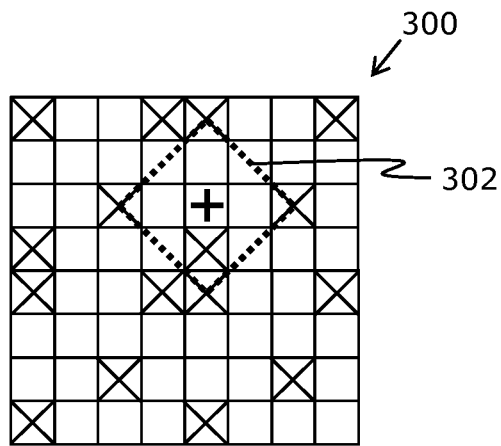
FIGS. 3A, 3B, 3C, and 3D illustrate an exemplary way of performing interpolation on subsampled image data of a part of a field of view of an image sensor, in accordance with an embodiment of the present disclosure.
Figure 3B:
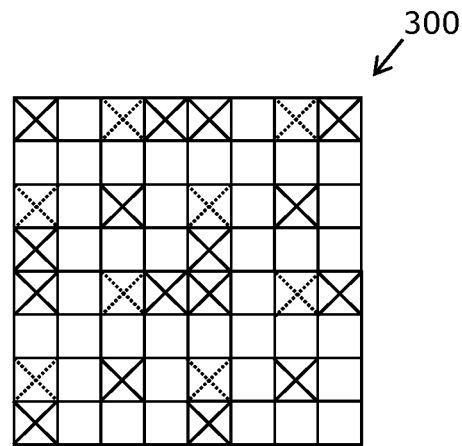

In FIG. 3A, pixels that are read out from the portion 300 are shown as 16 pixels that are crossed out as solid 'X's. A diamond pattern 302 is employed for generating image data, wherein image data corresponding to pixels at corners of the diamond pattern 302 is used to generate image data corresponding to a pixel (labelled as '+') lying in a centre of the diamond pattern 302. The diamond pattern 302 is moved across the portion 300, to generate image data corresponding to at least one (unread) pixel in the portion 300. In FIG. 3B, there are shown 8 pixels (crossed out as dotted 'X's) for which image data is generated using the diamond pattern 302.

Figure 3C:
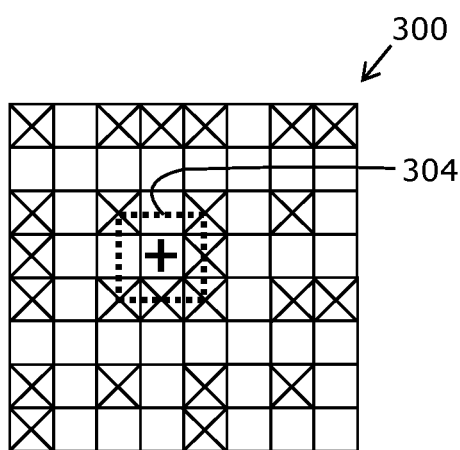
Figure 3D:
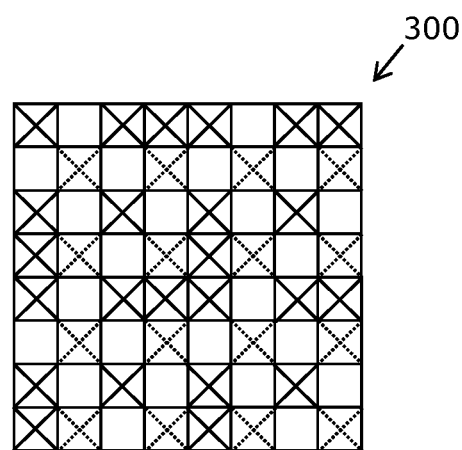

Next, in FIG. 3C, pixels for which image data is now available, are shown as 24 pixels that are crossed out as solid 'X's. A square pattern 304 is employed for generating image data, wherein image data corresponding to pixels at corners of the square pattern 304 is used to generate image data corresponding to a pixel (labelled as '+') lying in a centre of the square pattern 304. The square pattern 304 is moved across the portion 300, to generate image data corresponding to at least one (unread) pixel in the portion 300. In FIG. 3D, there are shown 16 pixels (crossed out as dotted 'X's) for which image data is generated using the square pattern 304. It will be appreciated that apart from using the diamond pattern 302 and the square pattern 304 as described hereinabove, when a remaining pixel (of the portion 300) lies diagonally in between two pixels that are read out from the portion 300, image data corresponding to said remaining pixel could be generated by averaging image data corresponding to the aforesaid two pixels, or by performing interpolation on the image data corresponding to the aforesaid two pixels.

Referring to FIGS. 4A and 4B, illustrated is an exemplary way in which first image data corresponding to a first image, and second image data corresponding to a second image is obtained for generating high dynamic range (HDR) images, in accordance with an embodiment of the present disclosure. Likewise, referring to FIGS. 4C and 4D, illustrated is an exemplary way in which first image data corresponding to a first image, and second image data corresponding to a second image is obtained for generating HDR images, in accordance with another embodiment of the present disclosure.

Figure 4C:
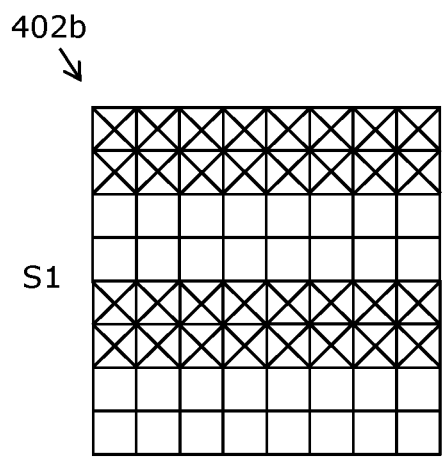
FIGS. 4C and 4D illustrate an exemplary way in which first image data corresponding to a first image, and second image data corresponding to a second image is obtained for generating HDR images, in accordance with another embodiment of the present disclosure.
Figure 4D:
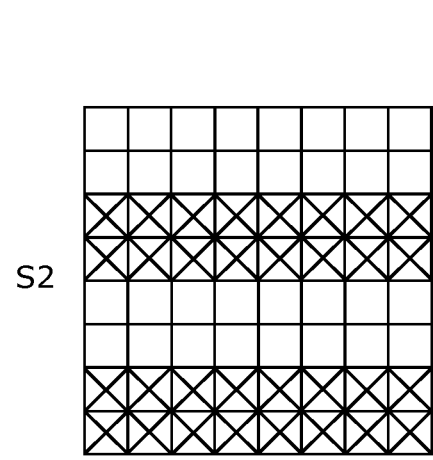

With reference to FIGS. 4A-4D, the first image is captured by a first image sensor using a first setting S1, while the second image is captured a second image sensor using a second setting S2 (that is different from the first setting S1). In this regard, the first image data is obtained for the first setting S1, while the second image data is obtained for the second setting S2. The first setting S1 and the second setting S2 pertain to at least one of: different exposure times, different sensitivities, different aperture sizes. With reference to FIGS. 4A and 4C, first subsampling patterns 402a and 402b are employed for subsampling the first image data, wherein the first image data comprises first subsampled image data of at least a first part of a first field of view of the first image sensor. As shown, out of 64 pixels, 32 pixels are read out according to the first subsampling patterns 402a and 402b, wherein image data pertaining to these 32 pixels is obtained for the first setting S1.

With reference to FIG. 4B, a second subsampling pattern 404a is employed for sampling the second image data, wherein the second image data comprises second sampled image data of an entirety of a second field of view of the second image sensor. In other words, the second image data is read out for the entirety of the second field of view from the second image sensor. As shown, all 64 pixels are read out according to the second subsampling pattern 404a, wherein image data pertaining to all the 64 pixels is obtained for the second setting S2. On the other hand, with reference to FIG. 4D, a second subsampling pattern 404b is employed for subsampling the second image data, wherein the second image data comprises second subsampled second image data of at least a second part of the second field of view of the second image sensor. As shown, out of 64 pixels, 32 pixels are read out according to the second subsampling pattern 404b, wherein image data pertaining to these 32 pixels is obtained for the second setting S2.

With reference to FIGS. 4A and 4B, the first subsampling pattern 402a and the second subsampling pattern 404a partially overlap with each other. In other words, the second subsampling pattern 404a is partially complimentary to the first subsampling pattern 402a. This means there are some common pixels that are read out according to the first subsampling pattern 402a as well as the second subsampling pattern 404a, though at the first setting S1 and the second setting S2, respectively. As shown, out of the 64 pixels, 32 pixels are such common pixels. On the other hand, with reference to FIGS. 4C and 4D, the first subsampling pattern 402b and the second subsampling pattern 404b do not overlap with each other at all. In other words, the second subsampling patterns 404b is fully complimentary to the first subsampling patterns 402b. As shown, out of 64 pixels, 32 distinct pixels are read out according to the first subsampling pattern 402b though at the first setting S1, and remaining 32 distinct pixels are read out according to the second subsampling pattern 404b though at the second setting S2.

For sake of clarity and simplicity, only a portion of a given subsampling pattern corresponding to an 8×8 grid of pixels arranged on a portion of a photo-sensitive surface of a given image sensor is depicted in the aforementioned figures and in some subsequent figures (such as FIGS. 6A, 6B, 6C, 6D, 6E, 6F, 7A, 7B, 7C, 7D, 8A, and 8B). Moreover, pixels that are read out according to a given subsampling pattern are crossed out as solid 'X's. The term "given subsampling pattern" encompasses the first subsampling pattern and/or the second subsampling pattern. The term "given image sensor" encompasses the first image sensor and/or the second image sensor.

Figure 5:
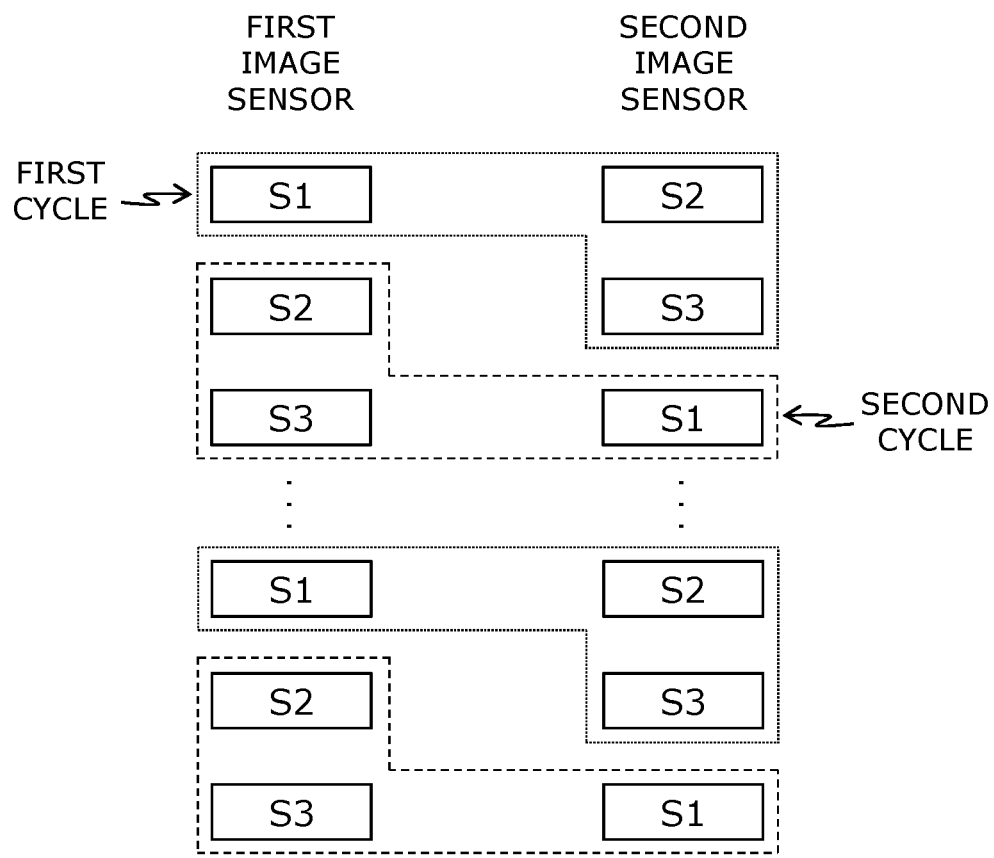
FIG. 5 illustrates an exemplary way in which first images and second images are processed for generating HDR images, in accordance with an embodiment of the present disclosure.

Referring to FIG. 5, illustrated is an exemplary way in which first images and second images are processed for generating high dynamic range (HDR) images, in accordance with an embodiment of the present disclosure. In FIG. 5, "S1" refers to an image that is captured by a given image sensor using a first setting S1, "S2" refers to an image that is captured by a given image sensor using a second setting S2, whereas "S3" refers to an image that is captured by a given image sensor using a third setting S3. The first setting S1, the second setting S2, and the third setting S3 are different from each other, and pertain to at least one of: different exposure times, different sensitivities, different aperture sizes. The term "given image sensor" encompasses a first image sensor and/or a second image sensor. In this regard, the first image sensor captures first images, while the second image sensor captures second images. In an $N^{th}$ cycle (for example, such as a first cycle) of generating the HDR images, a single first image (that is captured using the first setting S1) and two second images (that are captured using the second setting S2 and the third setting S3, respectively) are processed together to generate a first HDR image and a second HDR image. In an $N+1^{th}$ cycle (for example, such as a second cycle) of generating the HDR images, two first images (that are captured using the second setting S2 and the third setting S3, respectively) and a single second image (that is captured using the first setting S1) are processed together to generate the first HDR image and the second HDR image. For sake of simplicity and clarity, the single first image and the two second images utilised for generating the HDR images in the $N^{th}$ cycle are marked with dotted lines, whereas the two first images and the single first image utilised for generating the HDR images in the $N+1^{th}$ cycle are marked with dashed lines.

Figure 6A:
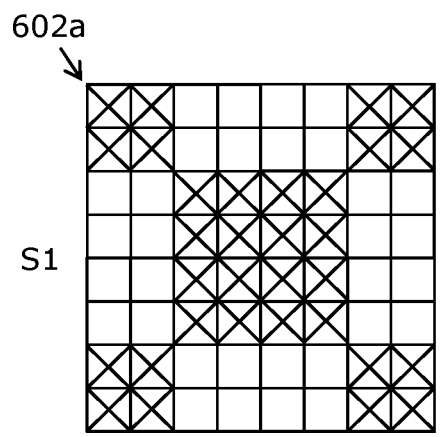
FIGS. 6A, 6B, and 6C illustrate an exemplary way in which first image data corresponding to a single first image, and second image data corresponding to respective ones of two second images are obtained for generating HDR images in an $N^{th}$ cycle, in accordance with an embodiment of the present disclosure.
Figure 6D:
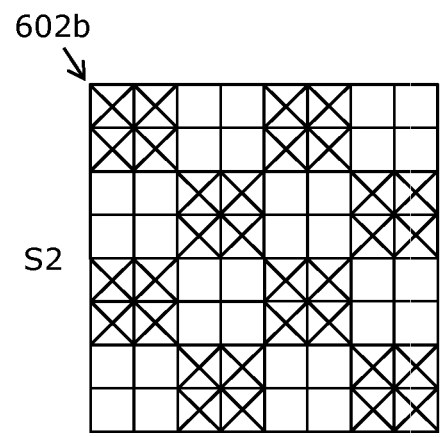
FIGS. 6D, 6E, and 6F illustrate an exemplary way in which first image data corresponding to respective ones of two first images, and second image data corresponding to a single second image are obtained for generating the HDR images in an $N+1^{th}$ cycle, in accordance with an embodiment of the present disclosure.
Figure 6B:
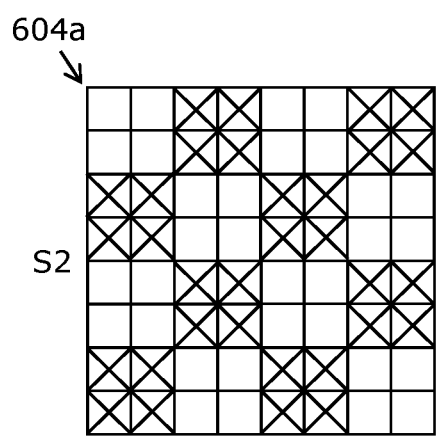
Figure 6E:
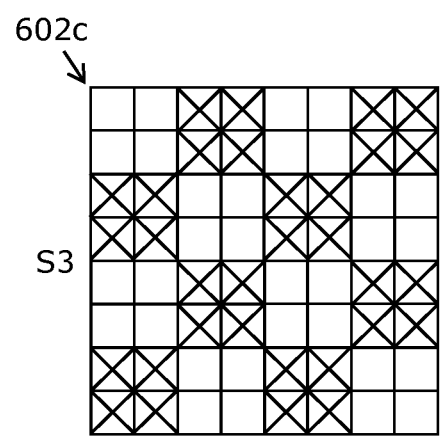
Figure 6C:
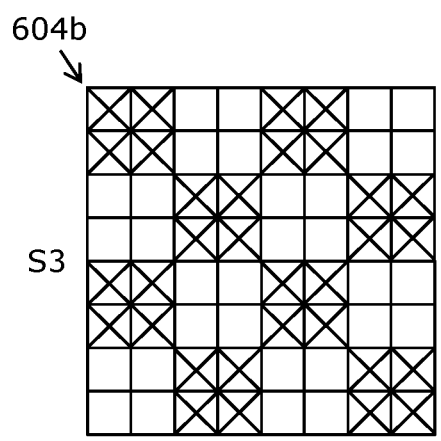

Referring to FIGS. 6A, 6B, and 6C, illustrated is an exemplary way in which first image data corresponding to a single first image and second image data corresponding to respective ones of two second images are obtained for generating high dynamic range (HDR) images in an $N^{th}$ cycle, in accordance with an embodiment of the present disclosure. Likewise, referring to FIGS. 6D, 6E, and 6F, illustrated is an exemplary way in which first image data corresponding to respective ones of two first images and second image data corresponding to a single second image are obtained for generating the HDR images in an $N+1^{th}$ cycle, in accordance with an embodiment of the present disclosure.

With reference to FIGS. 6A-6C, the single first image is captured by a first image sensor using a first setting S1, while the two second images are captured by a second image sensor using a second setting S2 and a third setting S3, respectively. In this regard, the first image data is obtained for the first setting S1, while the second image data corresponding to respective ones of the two second images is obtained for the second setting S2 and the third setting S3. The first setting S1, the second setting S2, and the third setting S3 are different from each other, and pertain to at least one of: different exposure times, different sensitivities, different aperture sizes. The first image data (corresponding to the single first image) and the second image data (corresponding to respective ones of the two second images) are processed together to generate a first HDR image and a second HDR image in the $N^{th}$ cycle.

With reference to FIG. 6A, a first subsampling pattern 602a is employed for subsampling the first image data, wherein the first image data comprises first subsampled image data of at least a first part of a first field of view of the first image sensor. As shown, out of 64 pixels, 32 pixels are read out according to the first subsampling pattern 602a, wherein image data pertaining to these 32 pixels is obtained for the first setting S1. With reference to FIGS. 6B and 6C, two different second subsampling patterns 604a and 604b are employed for subsampling the second image data (corresponding to respective ones of the two second images), wherein the second image data comprises second subsampled second image data of at least a second part of the second field of view of the second image sensor. As shown, out of 64 pixels, 32 distinct pixels are read out according to the second subsampling pattern 604a at the second setting S2, and remaining 32 distinct pixels are read out according to the second subsampling pattern 604b at the third setting S3.

Figure 6F:
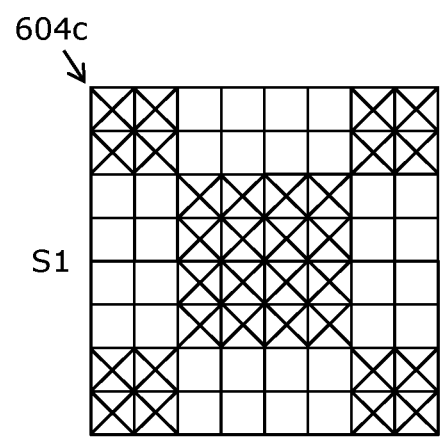

With reference to FIGS. 6D-6F, the two first images are captured by the first image sensor using the second setting S2 and the third setting S3, respectively, while the single second image is captured by the second image sensor using the first setting S1. In this regard, the first image data corresponding to respective ones of the two first images is obtained for the second setting S2 and the third setting S3, while the second image data is obtained for the first setting S1. The first image data (corresponding to respective ones of the two first images) and the second image data (corresponding to the single second image) are processed together to generate the first HDR image and the second HDR image in the N+1$^{th}$ cycle. With reference to FIGS. 6D and 6E, two different first subsampling patterns 602b and 602c are employed for subsampling the first image data (corresponding to respective ones of the two first images). As shown, out of 64 pixels, 32 distinct pixels are read out according to the first subsampling pattern 602b though at the second setting S2, and remaining 32 distinct pixels are read out according to the first subsampling pattern 602c though at the third setting S3. With reference to FIG. 6F, a second subsampling pattern 604c is employed for subsampling the second image data. As shown, out of 64 pixels, 32 pixels are read out according to the second subsampling pattern 604c, wherein image data pertaining to these 32 pixels is obtained for the first setting S1.

Figure 7A:
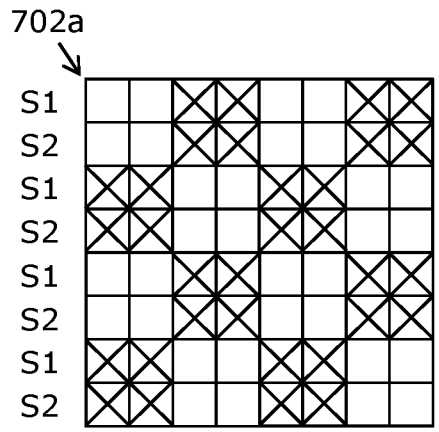
FIGS. 7A and 7B illustrate an exemplary way in which first image data corresponding to stripes of a single first image and second image data corresponding to stripes of a single second image are obtained for generating HDR images, in accordance with an embodiment of the present disclosure.
Figure 7B:
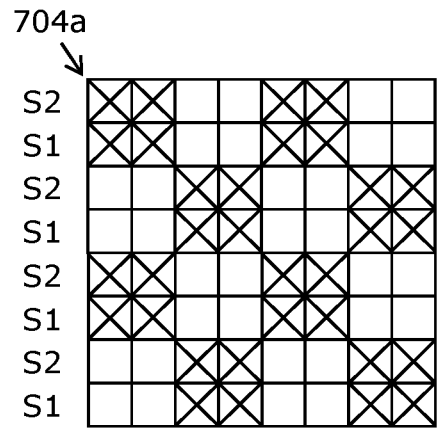

Referring to FIGS. 7A and 7B, illustrated is an exemplary way in which first image data corresponding to stripes of a single first image and second image data corresponding to stripes of a single second image are obtained for generating high dynamic range (HDR) images, in accordance with an embodiment of the present disclosure. Likewise, referring to FIGS. 7C and 7D, illustrated is an exemplary way in which first image data corresponding to stripes of a single first image and second image data corresponding to stripes of a single second image are obtained for generating high dynamic range (HDR) images, in accordance with another embodiment of the present disclosure.

Figure 7C:
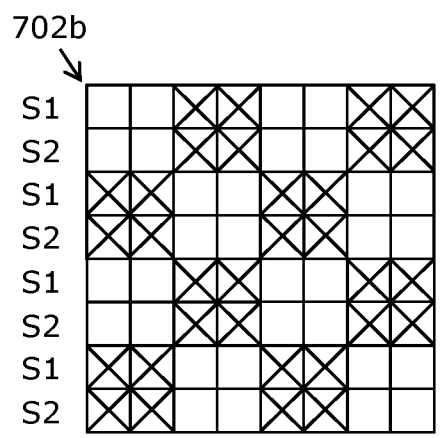
FIGS. 7C and 7D illustrate an exemplary way in which first image data corresponding to stripes of a single first image and second image data corresponding to stripes of a single second image are obtained for generating HDR images, in accordance with another embodiment of the present disclosure.
Figure 7D:
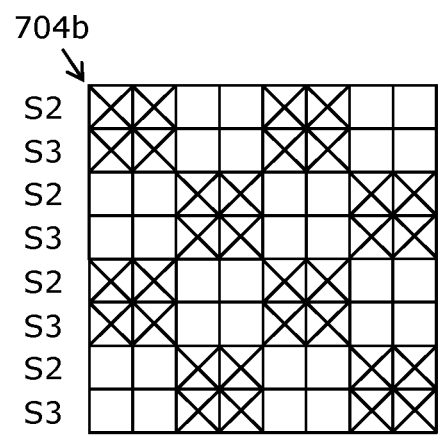

With reference to FIGS. 7A and 7C, the first image data is collected (upon capturing the single first image) by a first image sensor by employing two different settings (namely, a first setting S1 and a second setting S2) in a first stripe-wise varying manner. In this regard, first subsampling patterns 702a and 702b are employed for subsampling the first image data, wherein the first image data comprises first subsampled image data of at least a first part of a first field of view of the first image sensor. For sake of simplicity and clarity, with reference to FIGS. 7A, 7B, 7C, and 7D, 8 rows of pixels in the 8×8 grid of pixels correspond to 8 different horizontal stripes, wherein each horizontal stripe comprises a scanline of 8 pixels and a width of each horizontal stripe is equal to a size of one pixel. As shown, according to the first stripe-wise varying manner, image data corresponding to a first stripe, a third stripe, a fifth stripe, and a seventh stripe is obtained for the first setting S1; thus out of 32 pixels, 16 pixels are read out according to the first subsampling patterns 702a and 702b at the first setting S1. In addition to this, image data corresponding to a second stripe, a fourth stripe, a sixth stripe, and an eighth stripe is obtained for the second setting S2; thus out of 32 pixels, remaining 16 pixels are read out according to the first subsampling patterns 702a and 702b at the second setting S2. It will be appreciated that when any image data is subsampled, there may be some stripes or their portions that are not read at all.

With reference to FIG. 7B, the second image data is collected (upon capturing the single second image) by a second image sensor by employing two different settings (namely, a first setting S1 and a second setting S2) in a second stripe-wise varying manner. With reference to FIG. 7D, the second image data is collected by the second image sensor by employing two different settings (namely, the second setting S2 and a third setting S3) in another second stripe-wise varying manner. With reference to FIGS. 7B and 7D, second subsampling patterns 704a and 704b are employed for subsampling the second image data, wherein the second image data comprises second subsampled image data of at least a second part of a second field of view of the second image sensor.

With reference to FIG. 7B, as shown, according to the second stripe-wise varying manner, image data corresponding to a first stripe, a third stripe, a fifth stripe, and a seventh stripe is obtained for the second setting S2; thus out of 32 pixels, 16 pixels are read out according to the second subsampling pattern 704a at the second setting S2. In addition to this, image data corresponding to a second stripe, a fourth stripe, a sixth stripe, and an eighth stripe is obtained for the first setting S1; thus out of the 32 pixels, remaining 16 pixels are read out according to the second subsampling pattern 704a at the first setting S1.

With reference to FIG. 7D, as shown, according to the another second stripe-wise varying manner, image data corresponding to a first stripe, a third stripe, a fifth stripe, and a seventh stripe is obtained for the second setting S2; thus out of 32 pixels, 16 pixels are read out according to the second subsampling pattern 704b at the second setting S2. In addition to this, image data corresponding to a second stripe, a fourth stripe, a sixth stripe, and an eighth stripe is obtained for the third setting S3; thus out of the 32 pixels, remaining 16 pixels are read out according to the second subsampling pattern 704b at the third setting S3.

With reference to FIGS. 7A and 7B, the first stripe-wise varying manner and the second stripe-wise varying manner do not overlap with each other at all. In other words, the first stripe-wise varying manner is fully complimentary to the second stripe-wise varying manner. On the other hand, with reference to FIGS. 7C and 7D, the first stripe-wise varying manner and the another second stripe-wise varying manner partially overlap with each other. In other words, the first stripe-wise varying manner is partially complimentary to the another second stripe-wise varying manner.

The first setting S1, the second setting S2, and the third setting S3 are different from each other, and pertain to at least one of: different exposure times, different sensitivities, different aperture sizes. The first image data (corresponding to the stripes of the single first image) and the second image data (corresponding to the stripes of the single second image) are processed together to generate a first HDR image and a second HDR image.

Figure 8A:
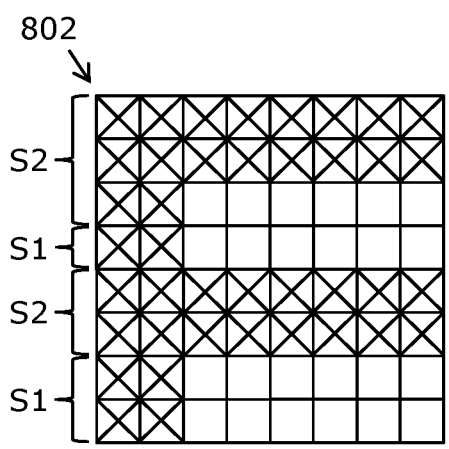
FIGS. 8A and 8B illustrate an exemplary way in which first image data corresponding to stripes of a single first image and second image data corresponding to a single second image are obtained for generating HDR images, in accordance with an embodiment of the present disclosure.
Figure 8B:
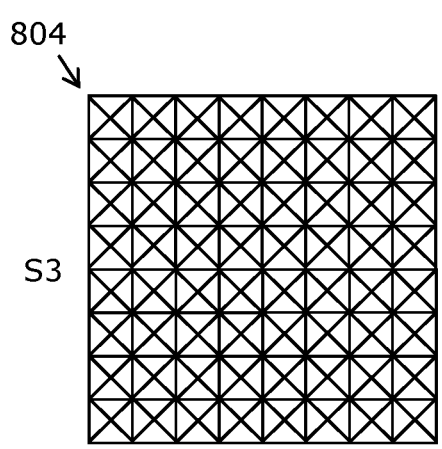

Referring to FIGS. 8A and 8B, illustrated is an exemplary way in which first image data corresponding to stripes of a single first image and second image data corresponding to a single second image are obtained for generating high dynamic range (HDR) images, in accordance with an embodiment of the present disclosure.

With reference to FIG. 8A, the first image data is collected (upon capturing the single first image) by a first image sensor by employing two different settings (namely, a first setting S1 and a second setting S2) in a stripe-wise varying manner. In this regard, a first subsampling pattern 802 is employed for subsampling the first image data, wherein the first image data comprises first subsampled image data of at least a first part of a first field of view of the first image sensor. For sake of simplicity and clarity, with reference to FIG. 8A, 8 rows of pixels in the 8×8 grid of pixels correspond to 4 different horizontal stripes, wherein a first horizontal stripe comprises first three scanlines of pixels, a second horizontal stripe comprises a fourth scanline of pixels, a third horizontal stripe comprises both a fifth scanline and a sixth scanline of pixels, and a fourth horizontal stripe comprises both a seventh scanline and an eighth scanline of pixels. Moreover, widths of the first horizontal stripe, the second horizontal stripe, the third horizontal stripe, and the fourth horizontal stripe are equal to a size of three pixels, a size of one pixel, a size of two pixels, and a size of two pixels, respectively. As shown, according to the stripe-wise varying manner, image data corresponding to the first stripe and the third stripe is obtained for the second setting S2, while image data corresponding to the second stripe and the fourth stripe is obtained for the first setting S1. Thus, out of 64 pixels, 40 pixels are read out according to the first subsampling pattern 802 at the two different settings. It will be appreciated that when any image data is subsampled, there may be some stripes or their portions that may not be read at all.

With reference to FIG. 8B, a second subsampling pattern 804 is employed for sampling the second image data, wherein the second image data comprises second sampled image data of an entirety of a second field of view of the second image sensor. In other words, the second image data is read out for the entirety of the second field of view from the second image sensor. As shown, all 64 pixels are read out according to the second subsampling pattern 804, wherein image data pertaining to all the 64 pixels is obtained for a third setting S3.

The first setting S1, the second setting S2, and the third setting S3 are different from each other, and pertain to at least one of: different exposure times, different sensitivities, different aperture sizes. The first image data (corresponding to the stripes of the single first image) and the second image data (corresponding to the single second image) are processed together to generate a first HDR image and a second HDR image.

FIGS. 3A-3D, 4A-4D, 5, 6A-6F, 7A-7D, and 8A-8D are merely examples, which should not unduly limit the scope of the claims herein. The person skilled in the art will recognize many variations, alternatives, and modifications of embodiments of the present disclosure.

Figures 9A, 9B, 10A, 10B:
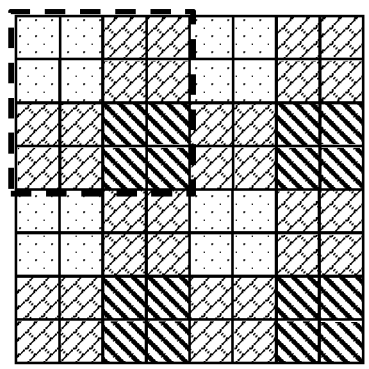

Referring to FIGS. 9A and 9B, illustrated are exemplary ways in which a given subsampling mask indicates colours of pixels using spatial pixel codes, in accordance with an embodiment of the present disclosure. With reference to FIGS. 9A and 9B, the given subsampling mask is shown as an 8×8 subsampling masking pattern, for the sake of simplicity and clarity. Moreover, a portion (depicted using a dashed box) of the given subsampling mask corresponds to a 4×4 array of pixels arranged on a portion of a photo-sensitive surface of an image sensor, and is optionally repeated in the given subsampling mask, for the sake of simplicity. With reference to FIG. 9A, the portion of the given subsampling mask indicates 4 pixels that have been read out from amongst 16 pixels, and also indicates colours of such 4 pixels, using different spatial pixel codes, for example, such as '0' indicating a green colour pixel, '1' indicating a blue colour pixel, and '2' indicating a red colour pixel. In addition to this, said portion of the given subsampling mask also indicates 12 pixels amongst the 16 pixels that have not been read out (namely, the pixels that are skipped during the read out), using a single spatial pixel code, for example, such as '4'. Such a single spatial pixel code only indicates that the 12 pixels have not been read out and thus, does not indicate colours of such 12 pixels.

With reference to FIG. 9B, the portion of the given subsampling mask indicates 4 pixels amongst 16 pixels that have been read out and also indicates colours of such 4 (read) pixels, using different spatial pixel codes, for example, such as '0' indicating a green colour pixel, '1' indicating a blue colour pixel, '2' indicating a red colour pixel, and '3' indicating another green colour pixel. In addition to this, said portion of the subsampling mask also indicates 12 pixels amongst the 16 pixels that have not been read out and also indicates colours of such 12 (unread) pixels, using different spatial pixel codes, for example, such as '4' indicating an unread green colour pixel, '5' indicating an unread red colour pixel, '6' indicating an unread blue colour pixel, and '7' indicating another unread green colour pixel.

FIGS. 9A and 9B are merely examples, which should not unduly limit the scope of the claims herein. The person skilled in the art will recognize many variations, alternatives, and modifications of embodiments of the present disclosure. As an example, with reference to FIG. 9A, the single spatial pixel code could also be different than that mentioned earlier. For example, the single spatial pixel code may be 3, 5, −1, −2, −3, or similar. As another example, with reference to FIG. 9B, the colours of the 4 pixels could also be indicated by using spatial pixel codes other than those mentioned earlier. For example, spatial pixel codes of the 4 unread pixels may be '−1', '−2', '−3', and '−4' for indicating the unread green colour pixel, the unread blue colour pixel, the unread red colour pixel, and the another unread green colour pixel, respectively. Similarly, the colours of the 12 pixels could also be indicated by using spatial pixel codes other than those mentioned earlier.

Referring to FIGS. 10A and 10B, FIG. 10A illustrates an exemplary colour filter array (CFA) pattern of a given image sensor indicated by a given subsampling mask, while FIG. 10B illustrates an exemplary way in which a portion of the given subsampling mask indicates colours in a smallest repeating 4×4 array in the given image sensor using different spatial pixel codes, in accordance with an embodiment of the present disclosure. With reference to FIG. 10A, a portion (depicted using a dashed box) of the CFA pattern corresponds to a 4×4 array of pixels arranged on a portion of a photo-sensitive surface of the given image sensor, and is repeated in the CFA pattern. The CFA pattern is shown as a quad Bayer pattern, wherein the quad Bayer pattern has, one 2×2 array of blue colour pixels (depicted as a dotted pattern), two 2×2 arrays of green colour pixels (depicted as a diagonal brick pattern), and one 2×2 array of red colour pixels (depicted as a diagonal line pattern).

With reference to FIG. 10B, the portion of the given subsampling mask indicates 4 blue colour pixels using 4 different spatial pixel codes '1', '2', '3', and '4', respectively. Similarly, the portion indicates 8 green colour pixels using 8 different spatial pixel codes '5', '6', '7', '8', '9', '10', '11', and '12', respectively. The portion indicates 4 red colour pixels using 4 different spatial pixel codes as '13', '14', '15' and '16', respectively.

FIGS. 10A and 10B are merely examples, which should not unduly limit the scope of the claims herein. The person skilled in the art will recognize many variations, alternatives, and modifications of embodiments of the present disclosure. As an example, with reference to FIG. 10B, when two green colour pixels having spatial pixel codes '9' and '10' or having spatial pixel codes '9' and '12' are to be read out together, this can be indicated in the subsampling mask by using a single spatial pixel code '17'. Similarly, when three red colour pixels having spatial pixel codes '13', '14', and '16' are to be read out together, this can be indicated in the subsampling mask by using a single spatial pixel code '18'. When all the four red colour pixels having spatial pixel codes '13', '14', '15', and '16' are to be read out together, this can be indicated in the subsampling mask by using a single spatial pixel code '19'.

What is claimed is:

1. An imaging system comprising:
   a first image sensor and at least one second image sensor that are to be employed to capture at least one first image and at least one second image, respectively, using at least two different settings pertaining to at least one of: an exposure time, a sensitivity, an aperture size; and
   at least one processor configured to:
      obtain, from the first image sensor and the at least one second image sensor, first image data and second image data corresponding to the at least one first image and to the at least one second image, respectively, wherein the first image data comprises first subsampled image data of at least a first part of a first field of view of the first image sensor, and the first part of the first field of view comprises at least a part of an overlapping field of view between the first image sensor and the at least one second image sensor; and
      process the first image data and the second image data together, using a high dynamic range (HDR) imaging technique, to generate a first HDR image and a second HDR image, wherein, when processing, the at least one processor is configured to:
         perform interpolation and demosaicking on the first subsampled image data, by employing the second image data and using the HDR imaging technique, to generate first intermediate image data;
         perform demosaicking on the second image data, by employing the first image data and using the HDR imaging technique, to generate second intermediate image data; and
         process the first intermediate image data and the second intermediate image data, to generate the first HDR image and the second HDR image, respectively.

2. The imaging system of claim 1, wherein the second image data comprises second subsampled image data of at least a second part of a second field of view of the at least one second image sensor, the second part of the second field of view comprises at least the part of the overlapping field of view between the first image sensor and the at least one second image sensor, wherein optionally, the first subsampled image data is subsampled according to a first subsampling pattern, and the second subsampled image data is subsampled according to a second subsampling pattern that is different from the first subsampling pattern, further wherein optionally, the second subsampling pattern is fully or partially complementary to the first subsampling pattern.

3. The imaging system of claim 1, wherein the at least one processor is configured to process the first image data and the second image data together to generate the first HDR image and the second HDR image using at least one neural network, wherein an input of the at least one neural network comprises the first image data and the second image data.

4. The imaging system of claim 1, wherein the at least one first image comprises two first images, the at least one second image comprises two second images, and the at least two different settings comprise four different settings at which respective ones of the two first images and the two second images are captured.

5. The imaging system of claim 1, wherein in an $N^{th}$ cycle of generating HDR images, the at least one first image comprises a single first image, the at least one second image comprises two second images, and the at least two different settings comprise three different settings at which respective ones of the single first image and the two second images are captured, wherein the single first image and the two second images are processed together to generate the first HDR image and the second HDR image in the $N^{th}$ cycle, and
   in an $N+1^{th}$ cycle of generating the HDR images, the at least one first image comprises two first images, the at least one second image comprises a single second image, and the at least two different settings comprise three different settings at which respective ones of the two first images and the single second image are captured, wherein the two first images and the single second image are processed together to generate the first HDR image and the second HDR image in the $N+1^{th}$ cycle.

6. The imaging system of claim 1, wherein the at least one first image comprises a single first image, the at least one second image comprises a single second image, wherein the single first image is captured by employing the at least two different settings in a first stripe-wise varying manner, the single second image is captured by employing the at least two different settings in a second stripe-wise varying manner,
   wherein stripes of the single first image and stripes of the single second image are processed together to generate the first HDR image and the second HDR image.

7. The imaging system of claim 6, wherein the first stripe-wise varying manner is fully or partially complementary to the second stripe-wise varying manner.

8. The imaging system of claim 1, wherein the at least one first image comprises a single first image, the at least one second image comprises a single second image, the at least two different settings comprise three different settings,
   wherein the single first image is captured by employing a first setting and a second setting from amongst the three different settings in a stripe-wise varying manner, while the single second image is captured by employing a third setting from amongst the three different settings, wherein the single second image is processed together with stripes of the single first image to generate the first HDR image and the second HDR image.

9. A method comprising:
   capturing at least one first image and at least one second image by employing a first image sensor and at least one second image sensor, respectively, using at least two different settings pertaining to at least one of: an exposure time, a sensitivity, an aperture size;
   obtaining, from the first image sensor and the at least one second image sensor, first image data and second image data corresponding to the at least one first image and to the at least one second image, respectively, wherein the first image data comprises first subsampled image data of at least a first part of a first field of view of the first image sensor, and the first part of the first field of view comprises at least a part of an overlapping field of view between the first image sensor and the at least one second image sensor; and
   processing the first image data and the second image data together, using a high dynamic range (HDR) imaging technique, to generate a first HDR image and a second HDR image, wherein the step of processing comprises:
      performing interpolation and demosaicking on the first subsampled image data, by employing the second image data and using the HDR imaging technique, to generate first intermediate image data;

performing demosaicking on the second image data, by employing the first image data and using the HDR imaging technique, to generate second intermediate image data; and processing the first intermediate image data and the second intermediate image data, to generate the first HDR image and the second HDR image, respectively.

10. The method of claim 9, wherein the second image data comprises second subsampled image data of at least a second part of a second field of view of the at least one second image sensor, the second part of the second field of view comprises at least the part of the overlapping field of view between the first image sensor and the at least one second image sensor, wherein optionally, the first subsampled image data is subsampled according to a first subsampling pattern, and the second subsampled image data is subsampled according to a second subsampling pattern that is different from the first subsampling pattern, further wherein optionally, the second subsampling pattern is fully or partially complementary to the first subsampling pattern.

11. The method of claim 9, wherein the step of processing the first image data and the second image data together to generate the first HDR image and the second HDR image is performed using at least one neural network, wherein an input of the at least one neural network comprises the first image data and the second image data.

12. The method of claim 9, wherein the at least one first image comprises two first images, the at least one second image comprises two second images, and the at least two different settings comprise four different settings at which respective ones of the two first images and the two second images are captured.

13. The method of claim 9, wherein in an $N^{th}$ cycle of generating HDR images, the at least one first image comprises a single first image, the at least one second image comprises two second images, and the at least two different settings comprise three different settings at which respective ones of the single first image and the two second images are captured, wherein the step of processing the first image data and the second image data further comprises processing the single first image and the two second images together, to generate the first HDR image and the second HDR image in the $N^{th}$ cycle, and in an $N+1^{th}$ cycle of generating the HDR images, the at least one first image comprises two first images, the at least one second image comprises a single second image, and the at least two different settings comprise three different settings at which respective ones of the two first images and the single second image are captured, wherein the step of processing the first image data and the second image data further comprises processing the two first images and the single second image together to generate the first HDR image and the second HDR image in the $N+1^{th}$ cycle.

14. The method of claim 9, wherein the at least one first image comprises a single first image, the at least one second image comprises a single second image, wherein the single first image is captured by employing the at least two different settings in a first stripe-wise varying manner, while the single second image is captured by employing the at least two different settings in a second stripe-wise varying manner, and wherein the step of processing the first image data and the second image data further comprises processing stripes of the single first image and stripes of the single second image together, to generate the first HDR image and the second HDR image, wherein optionally, the first stripe-wise varying manner is fully or partially complementary to the second stripe-wise varying manner.

15. The method of claim 9, wherein the at least one first image comprises a single first image, the at least one second image comprises a single second image, the at least two different settings comprise three different settings, wherein the single first image is captured by employing a first setting and a second setting from amongst the three different settings in a stripe-wise varying manner, while the single second image is captured by employing a third setting from amongst the three different settings, and wherein the step of processing the first image data and the second image data further comprises processing the single second image and stripes of the single first image together, to generate the first HDR image and the second HDR image.

* * * * *